(12) United States Patent
Noda

(10) Patent No.: US 7,167,110 B2
(45) Date of Patent: Jan. 23, 2007

(54) MULTI-LEVEL COMMUNICATION SYSTEM AND METHOD WITH ERROR CORRECTION

(75) Inventor: Seiichi Noda, Tokyo (JP)

(73) Assignee: NEC Corporation, Tokyo (JP)

( * ) Notice: Subject to any disclaimer, the term of this patent is extended or adjusted under 35 U.S.C. 154(b) by 800 days.

(21) Appl. No.: 10/337,302

(22) Filed: Jan. 7, 2003

(65) Prior Publication Data

US 2003/0165112 A1    Sep. 4, 2003

(30) Foreign Application Priority Data

Jan. 8, 2002   (JP)   .............................. 2002-001470
Jan. 8, 2002   (JP)   .............................. 2002-001471

(51) Int. Cl.
*H03M 5/16* (2006.01)
(52) U.S. Cl. ........................................ 341/57; 375/264
(58) Field of Classification Search .................. 341/57, 341/94, 58, 50; 375/264; 714/800
See application file for complete search history.

(56) References Cited

U.S. PATENT DOCUMENTS

| | | | | |
|---|---|---|---|---|
| 5,168,509 A | * | 12/1992 | Nakamura et al. | 375/286 |
| 5,633,892 A | * | 5/1997 | Krisher | 375/286 |
| 6,339,622 B1 | * | 1/2002 | Kim | 375/287 |
| 2002/0054557 A1 | * | 5/2002 | Mouri et al. | 369/59.13 |
| 2005/0201479 A1 | * | 9/2005 | Noda | 375/261 |

FOREIGN PATENT DOCUMENTS

| JP | 04-196945 | 7/1992 |
|---|---|---|
| JP | 2003-60724 | 2/2003 |
| JP | 2003-134184 | 5/2003 |

OTHER PUBLICATIONS

Michelson, et al., "Error-Control Techniques For Digital Communication", John Wiley & Sons, 1985, Chapter 6 "Nonbinary BCH Codes And Reed-Solomon Codes".
Miyagawa, et al., "Code Theory", Appendix II,"Table of Irreducible Polynomials on GCP, (where P is a prime number)", Shokoodo Press, 1973.

(Continued)

*Primary Examiner*—Peguy JeanPierre
(74) *Attorney, Agent, or Firm*—McGinn IP Law Group, PLLC

(57) ABSTRACT

A communication system for transmitting a six-phase modulated signal and including an efficient error correction system suitable for the six-phase modulated signal is disclosed. A transmitting apparatus comprises a ternary error correction encoding circuit for generating a ternary transmit sequence, a parity generation circuit for generating a parity, a parity insertion circuit for inserting the parity into a binary transmit sequence, and a six-phase modulator for performs six-phase modulation. A receiving apparatus comprises a parity generation circuit for generating a parity, a parity separation circuit for separating a received parity, a parity comparison circuit for calculating a difference between the parity and the received parity, a syndrome calculation circuit for calculating a syndrome, a ternary error correction decoding circuit for producing a ternary decoded sequence, a high-order digit correction circuit for producing a binary decoding sequence, and a 6-ary to binary conversion circuit for producing a binary received signal is obtained from the ternary decoded sequence and binary decoding sequence.

47 Claims, 20 Drawing Sheets

OTHER PUBLICATIONS

European Search Report dated Apr. 5, 2006.
Ginzburg V V, "Multidimensional Signals for a Continuous Channel", Problems of Information Transmissions, 1984, pp. 20-34, XP009063429, no month.
Chen C-J et al., "Construction of Linear Ring Codes for 6 PSK", IEEE Transactions on Information Theory, IEEE Service Center, Piscataway, NJ, US, vol. 40, No. 2, Mar. 1, 1994, pp. 563-566, XP000457447.
"Multilevel Codes Based on Partitioning", IEEE Transactions on Information Theory, IEEE Service Center, Piscataway, NJ, US, vol. 35, No. 1, Jan. 1989, pp. 87-98, XP000048342.
Kschischang F R et al., "Block Coset Codes for M-ary Phase Shift Keying". IEEE Journal on Selected Areas in Communications, IEEE Service Center, Piscataway, NJ, US, vol. 7, No. 6, Aug. 1, 1989, pp. 900-913, XP000048614.
Morelos-Zaragoza Robert H., "The Art of Error Correcting Coding", pp. 101-120, 2002, John Wiley and Sons, New York, XP002366026.
Macwilliams F J and Sloane N J A, "Theory of Error-Correcting Codes Passage", Theory of Error-Correcting Codes, X, XX, 1977, pp. 23-29, XP002226718, no month.
Macwilliams F J and Sloane N J A, : Theory of Error-Correcting Codes Passage, Theory of Error-Correcting Codes, pp. 15-17, 1977, North-Holland, Amsterdam, XP002372622, no month.
Morelos-Zaragoza Robert H et al., "Multilevel Coded Modulation for Unequal Error Protection and Multistage Decoding-Part I: Symmetric Constellations" IEEE Transactions on Communications, IEEE Service Center, Piscataway, NJ, US, vol. 48, No. 2, Feb. 2000 (2000-2002), pp. 204-213, XP011010776.
Macwilliams F J Sloane N J A, "The Theory of Error-Correcting Codes (passage)", 1977, North-Holland, Amsterdam, XP002387260, no month.
European Search Report dated Jul. 11, 2006.

* cited by examiner

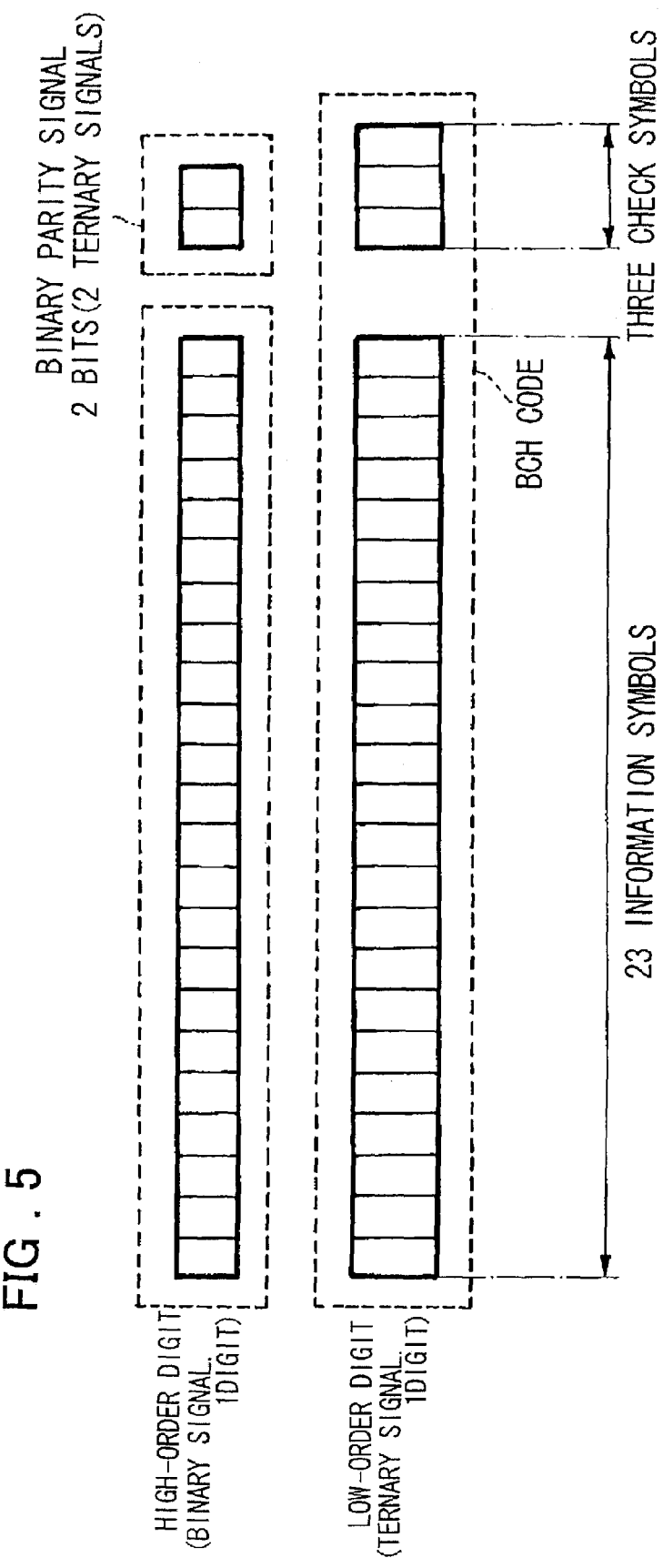

MULTI-LEVEL COMMUNICATION SYSTEM AND METHOD WITH ERROR CORRECTION

FIELD OF THE INVENTION

The present invention relates to a communication system and a communication method for transmitting/receiving signals over a transmission line. More specifically, the invention relates to a communication system and a communication method employing multi-level modulation system.

BACKGROUND OF THE INVENTION

The multi-level modulation system is employed, in particular in digital micro-wave communication. Heretofore, $2^n$QAM, such as BPSK, 4QAM, 16QAM, 32QAM, 64QAM, 128QAM, 256QAM and so forth have been used in the multi-level modulation.

In the digital micro-wave communication, BPSK, 4QAM, 16QAM, 32QAM, 64QAM, 128QAM, 256QAM and so forth have been used in general for circuit simplicity. However, with recent progress in the integrated circuit technology, implementation difficulties ascribable to circuit complexity are decreasing, while a demand for effective frequency utilization and effective transmission power utilization are becoming stronger.

For meeting this demand, various methods for constructing the multi-level modulation system, in which the number of the multi-level is not necessary $2^n$, have been proposed. Typical of these are "Multi-Level Modulation Demodulation Communication Method and System" as disclosed in the JP Patent Kokai Publication JP-A-04-196945, "Multi-Level Modulation Demodulation Device, Multi-Level Modulation Demodulation Communication System, Modulation Demodulation Program and Modulation Demodulation Method" as disclosed in the JP Patent Application No. 2001-246891, not laid open as of the filing time of the present application, and "Multi-Level Modulation Demodulation Device, Multi-Level Modulation Demodulation Communication System, Modulation Demodulation Program and Modulation Demodulation Method" as disclosed in the JP Patent Application No. 2001-246890, not laid open as of the filing time of the present invention.

SUMMARY OF THE DISCLOSURE

The above proposals are directed to the methods for constructing the multi-level modulation, but not to the application of the multi-leveled error correction system. In consideration of error occurrence on the transmission line, it is mandatory to encode an information sequence into a transmit sequence and to decode the received sequence added with errors produced on the transmission line to obtain a decoded sequence. An error correction system is therefore required which is coping with the degradation of signal quality on the multi-level modulation system.

FIG. 16 shows a configuration of a correction system conforming to a 6-ary modulation system which is thought to be routine among those skilled in the art. Referring to FIG. 16, a transmitting apparatus 901 in the conventional system includes a binary error correction encoding circuit 902, a binary to 6-ary conversion circuit 903, and a six-phase modulator 904, while a receiving apparatus 921 of the related art includes a six-phase demodulator 922, a 6-ary to binary conversion circuit 923, and a binary error correction decoding circuit 924. In the transmitting apparatus 901 and the receiving apparatus 921 of the conventional system, a nonbinary error correction system, based on a nonbinary error correction code is not employed. In the transmitting apparatus 901, the binary error correction encoding circuit 902 for generating an error correction code based on a binary signal is placed in front of the binary to 6-ary conversion circuit 903, whereas, in the receiving apparatus 921, the binary error correction decoding circuit 924 for carrying out error correction based on the binary signal, is placed at the back of the 6-ary to binary conversion circuit 923.

However, with the configuration of FIG. 16, no efficient error correction system for coping with the degradation of signal quality on the multi-level transmission, can be implemented. That is, the configuration of FIG. 16 leads to redundancy for achieving the equivalent code length, which is larger than in the case the nonbinary code is used.

Accordingly, it is an object of the present invention to provide a communication system and a communication method for transmitting a multi-phase modulated signal, which include an efficient error correction system suitable for the multi-phase modulated signal.

The above and other objects are attained by a communication system in accordance with one aspect of the present invention, which includes a transmitting apparatus and a receiving apparatus for transmitting and receiving signals over a transmission line, wherein the transmitting apparatus comprises:

a binary to n-ary conversion unit for converting a binary transmit signal into an n-ary transmit sequence and a ternary information sequence, where n is an integer exceeding 1;

an encoding unit for generating a ternary transmit sequence comprised of a nonbinary error correction code, based on said ternary information sequence;

a transmit side parity generation unit for generating a parity for said ternary transmit sequence; and a modulator for modulating said n-ary transmit sequence, said ternary transmit sequence, and said parity generated by said transmit side parity generation unit into a 3n-ary signal to transmit the 3n-ary signal to said receiving apparatus; and wherein said receiving apparatus comprises:

a demodulator for demodulating a 3n-ary received signal sent from said transmitting apparatus and received by said receiving apparatus to produce an n-ary received sequence, a ternary received sequence, and a received parity;

a receive side parity generation unit for generating a parity for said ternary received sequence;

a parity comparison unit for comparing said parity generated by said receive side parity generation unit with said received parity to determine a parity difference therebetween;

a first decoding unit for decoding said ternary received sequence by using said parity difference and a method of decoding a nonbinary error correction code to produce a ternary decoded sequence;

a second decoding unit for correcting said n-ary received sequence according to contents of correction of said ternary received sequence performed by said first decoding unit to produce an n-ary decoded sequence; and an n-ary to binary conversion unit for producing a binary received signal from said n-ary decoded sequence and said ternary decoded sequence.

In the above described communication system according to the present invention, it may be so arranged that the transmitting apparatus further comprises a parity insertion unit for inserting the parity generated by the transmit side parity generation unit into the n-ary transmit sequence. In this case, it may be so arranged that the parity generated by the transmit side parity generation unit is included in the n-ary transmit sequence, and that the receiving apparatus further includes parity separation unit for separating the received parity from the n-ary received sequence.

In the above described communication system according to the present invention, it may be so arranged that the transmitting apparatus further comprises a parity insertion unit for inserting the parity generated by the transmit side parity generation unit into the ternary transmit sequence. In this case, it may be so arranged that the parity generated by the transmit side parity generation unit is included in the ternary transmit sequence, and that the receiving apparatus further comprises parity separation unit for separating the received parity from the ternary received sequence.

In the above described communication system according to the present invention, the modulator is preferably comprised of a phase modulator and the demodulator is preferably comprised of a phase demodulator.

In the above described communication system according to the present invention, the second decoding unit may be adapted to correct a value of a symbol in the n-ary received sequence corresponding to a symbol in the ternary received sequence for which correction from 2 to 0 or 0 to 2 has been performed.

According to another aspect of the present invention, there is provided a transmitting apparatus comprising:

a binary to n-ary converting unit for converting a binary transmit signal to an n-ary transmit sequence and a ternary information sequence, where n is an integer exceeding 1;

an encoding unit for generating a ternary transmit sequence comprised of a nonbinary error correction code, based on said ternary information sequence;

a parity generation unit for generating a parity for said ternary transmit sequence; and a modulator for modulating said n-ary transmit sequence, said ternary transmit sequence, and said parity generated by said parity generation unit into a 3n-ary signal to transmit the 3n-ary signal.

The above described transmitting apparatus according to the present invention may further comprise: a parity insertion unit for inserting the parity generated by the parity generation unit into the n-ary transmit sequence. In this case, the parity generated by the transmitting parity generation unit is included in the n-ary transmit sequence.

The above described transmitting apparatus according to the present invention may further comprises a parity insertion unit for inserting the parity generated by the parity generation unit into the ternary transmit sequence. In this case, the parity generated by the transmitting parity generation unit is included in the ternary transmit sequence.

In the above-described transmitting apparatus according to the present invention, the modulator is preferably comprised of a phase modulator.

According to a further aspect of the present invention, there is provided a receiving apparatus comprising:

a demodulator for demodulating a 3n-ary received signal to produce an n-ary received sequence, a ternary received sequence, and a received parity, where n is an integer exceeding 1;

a parity generation unit for generating a parity for said ternary received sequence;

a parity comparison unit for comparing said parity generated by said parity generation unit with said received parity to determine a parity difference therebetween;

a first decoding unit for decoding said ternary received sequence by using said parity difference and a method of decoding a nonbinary error correction code to produce a ternary decoded sequence;

a second decoding unit for correcting said n-ary received sequence according to contents of correction of said ternary received sequence performed by said first decoding unit to produce an n-ary decoded sequence; and an n-ary to binary converting unit for producing a binary received signal from said n-ary decoded sequence and said ternary decoded sequence.

The parity obtained by the demodulator may be included in the n-ary received sequence. The above described receiving apparatus according to the present invention may further comprises parity separation unit for separating the received parity from the n-ary received sequence.

The parity obtained by the demodulator may be included in the ternary received sequence, and the receiving apparatus described above may further include parity separation unit for separating the received parity from the ternary received sequence.

In the above-described receiving apparatus according to the present invention, the demodulator is preferably comprised of a phase demodulator.

In the above described receiving apparatus according to the present invention, the second decoding unit may correct the value of a symbol in the n-ary received sequence corresponding to a symbol in the ternary received sequence for which correction of 2 to 0 or 0 to 2 has been performed.

The above object and other objects are attained by a communication system in accordance with a further aspect of the present invention, which includes a transmitting apparatus and a receiving apparatus for transmitting and receiving signals over a communication channel, wherein the transmitting apparatus comprises:

a binary to n-ary converting unit for converting a binary transmit signal to an n-ary transmit sequence and a ternary information sequence, where n is an integer exceeding 1;

an encoding unit for generating a ternary transmit sequence comprised of a nonbinary error correction code, based on said ternary information sequence; and a modulator for modulating said n-ary transmit sequence and said ternary transmit sequence into a 3n-ary signals to send the 3n-ary signal to said receiving apparatus; and wherein said receiving apparatus comprises:

a demodulator for demodulating a 3n-nary received signal sent from said transmitting apparatus and received by said receiving apparatus for producing an n-ary received sequence and a ternary received sequence;

a first decoding unit for decoding said ternary received sequence by using a method of decoding a nonbinary error correction code to produce a ternary decoded sequence;

a second decoding unit for correcting said n-ary received sequence according to contents of correction of said ternary received sequence performed by said first decoding unit to produce an n-ary decoded sequence; and an n-ary to binary conversion unit for producing a binary received signal from said n-ary decoded sequence and said ternary decoded sequence.

In the above described communication system according to the present invention, the modulator is preferably comprised of a phase modulator and the demodulator is preferably comprised of a phase demodulator.

In the above described communication system according to the present invention, the second decoding unit corrects a values of a symbol in the n-ary received sequence corresponding to a symbol in the ternary received sequence for which correction from 2 to 0 or from 0 to 2 is performed.

In accordance with another aspect of the present invention, there is provided a transmitting apparatus comprising:

a binary to n-ary converting unit for converting a binary transmit signal to an n-ary transmit sequence and a ternary information sequence, where n is an integer exceeding 1;

an encoding unit for generating a ternary transmit sequence, composed of a nonbinary error correction code, based on said ternary transmission sequence; and a modulator for modulating said n-ary transmit sequence and said ternary transmit sequence into a 3n-ary signal to transmit the 3n-nary signal.

In the above-described transmitting apparatus, the modulator is preferably comprised of a phase modulator.

In accordance with a further aspect of the present invention, there is provided a receiving apparatus comprising:

a demodulator for demodulating a 3n-ary received signal to produce an n-ary received sequence and a ternary received sequence, where n is an integer exceeding 1;

a first decoding unit for decoding said ternary received sequence by using a method of decoding a nonbinary error correction code to produce a ternary decoded sequence;

a second decoding unit for correcting said n-ary received sequence, according to contents of correction of said ternary received sequence by said first decoding unit to produce an n-ary decoded sequence; and an n-ary to binary converting unit for producing a binary received signal from said n-ary decoded sequence and said ternary decoded sequence.

In the above receiving apparatus, the modulator is preferably comprised of a phase modulator.

In the above receiving apparatus, the second decoding unit corrects a value of a symbol in the n-ary received sequence corresponding to a symbol in the ternary received sequence for which correction from 2 to 0 or from 0 to 2 is performed.

In accordance with a further aspect of the present invention, there is provided a communication method for transmitting and receiving signals over a transmission line, comprising the steps of:

said transmitting apparatus converting a binary transmit signals to an n-ary transmit sequence and a ternary information sequence, where n is an integer exceeding 1;

said transmitting apparatus generating a ternary transmit sequence, comprised of a nonbinary error correction code, based on said ternary information sequence; and said transmitting apparatus modulating said n-ary transmit sequence and said ternary transmit sequence into a 3n-ary signal to send the ternary signal to said receiving apparatus;

a receiving apparatus demodulating a 3n-ary received signal sent from said transmitting apparatus and received by said receiving apparatus for producing an n-ary received sequence and a ternary received sequence;

said receiving apparatus decoding said ternary received sequence by using a method of decoding a nonbinary error correction code to produce a ternary decoded sequence;

said receiving apparatus correcting said n-ary received sequence, according to contents of correction of said ternary received sequence, to produce an n-ary decoded sequence; and said receiving apparatus producing a binary received signal from said n-ary decoded sequence and said ternary decoded sequence.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 5 are diagrams showing a configuration of a transmit sequence according to the first embodiment of the present invention;

PREFERRED EMBODIMENTS OF THE INVENTION

Preferred embodiments of the present invention will be described in detail with reference to the appended drawings.

Figure 1:
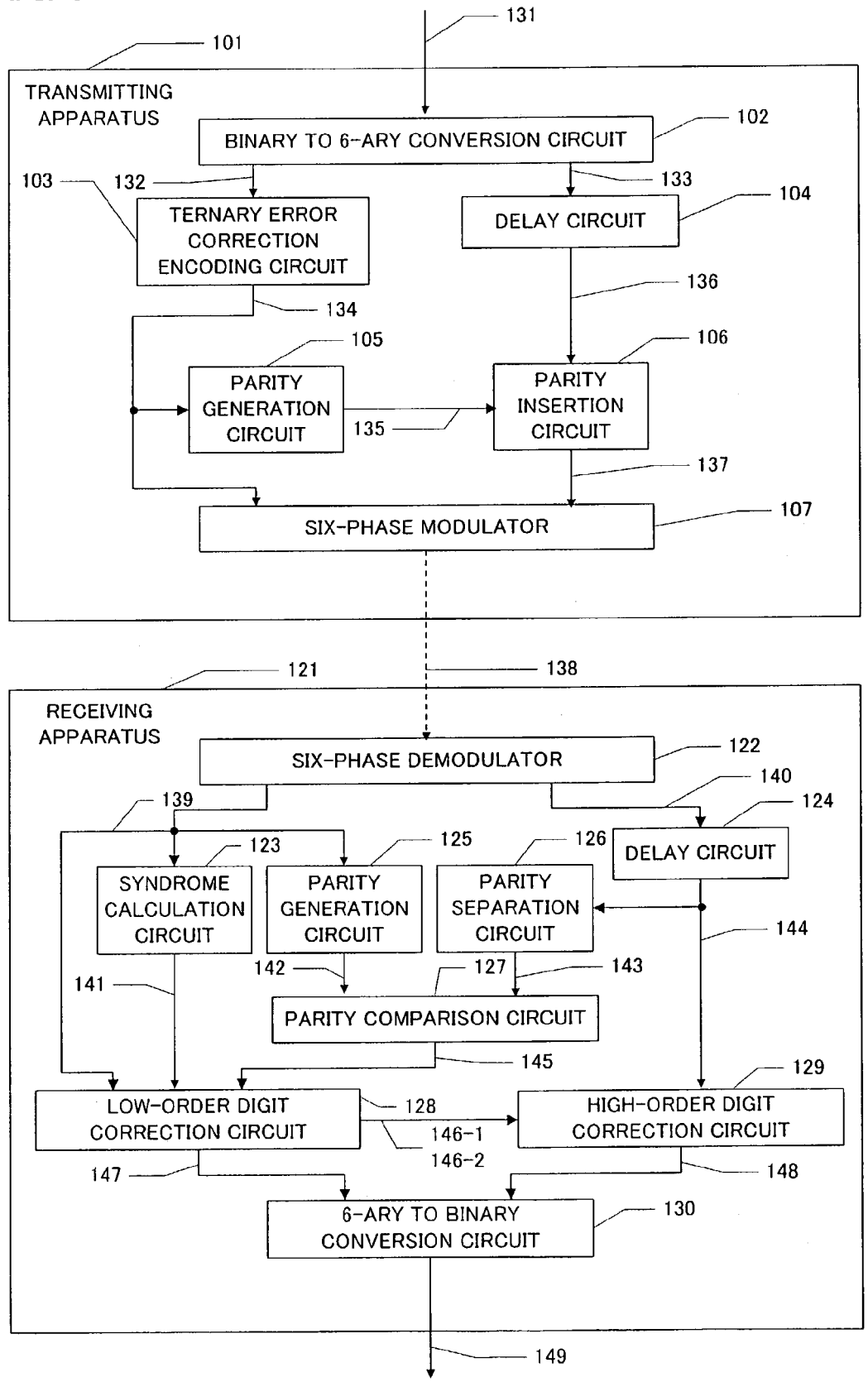
FIG. 1 is a block diagram showing a configuration of a communication system according to a first embodiment of the present invention.

FIG. 1 is a diagram illustrating a configuration of a communication system according to an embodiment of the present invention. Referring to FIG. 1, a transmitting apparatus 101 comprises a binary to 6-ary converter 102, a ternary error correction encoding circuit 103, a delay circuit 104, a parity generation circuit 105, a parity insertion circuit 106, and a six-phase modulator 107. A receiving apparatus 121 comprises a six-phase demodulator 122, a syndrome calculation circuit 123, a delay circuit 124, a parity generation circuit 125, a parity separation circuit 126, a parity comparison circuit 127, a low-order digit correction circuit 128, a high-order digit correction circuit 129 and a 6-ary to binary conversion circuit 130.

In the transmitting apparatus 101, a binary transmit signal 131 is supplied to the binary to 6-ary converter 102 which converts the input binary signal to a 6-ary signal composed by a ternary lower-order signal and a binary higher-order signal. The ternary lower-order signal is supplied to the ternary error correction encoding circuit 103 as a ternary information sequence 132, and the binary higher-order signal is supplied to the delay circuit 104 as a binary transmit sequence 133. The ternary error correction encoding circuit 103 performs ternary error correction encoding of the ternary information sequence 132 based on a ternary error correction code, thereby generating a ternary transmit sequence 134. The ternary transmit sequence 134 is supplied to the parity generation circuit 105 as well as a six-phase modulator 107. The parity generation circuit 105 calculates a parity for the ternary transmit sequence 134. On the other hand, the binary transmit sequence 133 is delayed by the delay circuit 104 by the same period of time as that for delaying the ternary information sequence 132 using the ternary error correction encoding circuit 103. Then, a resulting delayed binary transmit sequence 136 is supplied to the parity insertion circuit 106. The parity insertion circuit 106 inserts a parity 135 generated by the parity generation circuit 105 into free slots of the delayed binary transmit sequence 136. A binary transmit sequence 137 into which the parity 135 has been inserted is supplied to the six-phase modulator 107. The six-phase modulator 107 performs six-phase modulation of a 6-ary transmit sequence, which is composed by the ternary transmit sequence 134 and the binary transmit sequence 137, and transmits a modulated signal 138 to a receiving apparatus 121 over a transmission line.

In the receiving apparatus 121, the six-phase demodulator 122 performs six-phase demodulation of the received signal 138 which has been sent from the transmitting apparatus 101 over the transmission line and received by the receiving apparatus 121, and outputs a ternary received sequence 139 and a binary received sequence 140. The ternary received sequence 139 is supplied to the syndrome calculation circuit 123. The syndrome calculation circuit 123 constitutes part of a ternary error correction decoding circuit associated with the ternary error correction encoding circuit 103, and generates a syndrome 141 from the ternary received sequence 139. The ternary received sequence 139 is also supplied to a parity generation circuit 125. The parity generation circuit 125 calculates a parity 142 for the ternary received sequence 139, and then supplies the calculated parity 142 to the parity comparison circuit 127. On the other hand, the binary received sequence 140 is delayed so that timing for the parity 142 calculated by the parity generation circuit 125 matches timing for a received parity 143 separated by the parity separation circuit 126. A delayed binary received sequence 144 is supplied to the parity separation circuit 126 and a high-order digit correction circuit 129. The parity separation circuit 126 separates the received parity 143 inserted into the binary received sequence 144 and then supplies the received parity 143 to the parity comparison circuit 127. The parity comparison circuit 127 compares the calculated parity 142 with the received parity 143, determines a difference between the parity 142 and the received parity 143, and then supplies a parity difference 145 to the low-order digit correction circuit 128. The parity difference 145 indicates the direction of an error (in the form of a positive sign or a negative sign) when the error of one symbol with magnitude 1 is present in the ternary received sequence 139. The low-order digit correction circuit 128 constitutes the remainder part of the ternary error correction decoding circuit associated with the ternary error correction encoding circuit 103. The low-order digit correction circuit 128 uses the syndrome 141 and the parity difference 145 to correct an error in the ternary received sequence 139, and then supplies a ternary decoded sequence 147 to the 6-ary to binary conversion circuit 130. The high-order digit correction circuit 129 corrects an error in the delayed binary received sequence 144 based on a ternary received sequence 146-1 and a ternary decoded sequence 146-2 supplied from the low-order digit correction circuit 128, thereby generating a binary decoded sequence 148 for supply to the 6-ary to binary conversion circuit 130. The 6-ary to binary conversion circuit 130 converts the received ternary decoded sequence 147 and the binary decoded sequence 148 into a received binary signal 149 to output the received binary signal 149.

Next, the ternary error correction code will be described. First, the code parameters of the ternary BCH (Bose-Chaudhuri-Hocquenghem) code as typical of the ternary error correction code will be explained. The ternary BCH code is formed on the basis of the following p-degree generating polynomial p(x) having coefficients of $a_0, a_1, \ldots a_p$ with the elements of 0, 1, 2:

$$p(x)=x^p+a_{p-1}x^{p-1}+\ldots+a_1x+a_0$$

where $$a_i=0,1,2 \qquad (1)$$

When performing bi-directional correction of plus 1 and minus 1 (corresponding to 2 on a Galois field GF(3)), a code length n is $(3^p-1)/2$ if the error direction is unknown. If the error direction is known, the code length n is $3^p-1$. Generally, irrespective of whether the error direction is known or unknown, if the code length is denoted n, an information length k is n−t·p and redundancy is (n−k)/n when t-fold error correction is performed. Accordingly, if the error direction is known, the redundancy is less than in the case where the error direction is not known.

In the case of a one-fold error correction ternary BCH code, the generating polynomial is, for example, the following generating polynomial with the number of degrees being three:

$$p(x)=x^3+2x+1 \qquad (2)$$

In view of the bi-directional error correction, if the error direction is known, the code length becomes 26, and the information length becomes 23, for example. Then, we have a following check matrix H:

$$H = \begin{bmatrix} 1 & 0 & 0 & 2 & 0 & 2 & 1 & 2 & 2 & 1 & 0 & 2 & 2 & 2 & 0 & 0 & 1 & 0 & 1 & 2 & 1 & 1 & 2 & 0 & 1 & 1 \\ 0 & 1 & 0 & 1 & 2 & 1 & 1 & 2 & 0 & 1 & 1 & 1 & 0 & 0 & 2 & 0 & 2 & 1 & 2 & 2 & 1 & 0 & 2 & 2 & 2 & 0 \\ 0 & 0 & 1 & 0 & 1 & 2 & 1 & 1 & 2 & 0 & 1 & 1 & 1 & 0 & 0 & 2 & 0 & 2 & 1 & 2 & 2 & 1 & 0 & 2 & 2 & 2 \end{bmatrix} \quad (3)$$

Incidentally, the error correction codes such as nonbinary BCH codes or Reed-Solomon codes are discussed in great detail in Arnold M. Michelson, Allen H. Levesque, "ERROR-CONTROL TECHNIQUES FOR DIGITAL COMUNICATION", John Wiley & Sons, 1985, Chapter 6 "Nonbinary BCH Codes and Reed-Solomon Codes". The parameters of the nonbinary BCH codes are indicated in Yo Miyagawa, Yoshihiro Iwatare and Hideki Imai, "Code Theory", Shokoodo Press, 1973, Appendix II "Table of Irreducible Polynominals on G(p), where p is a prime number".

Figure 2:
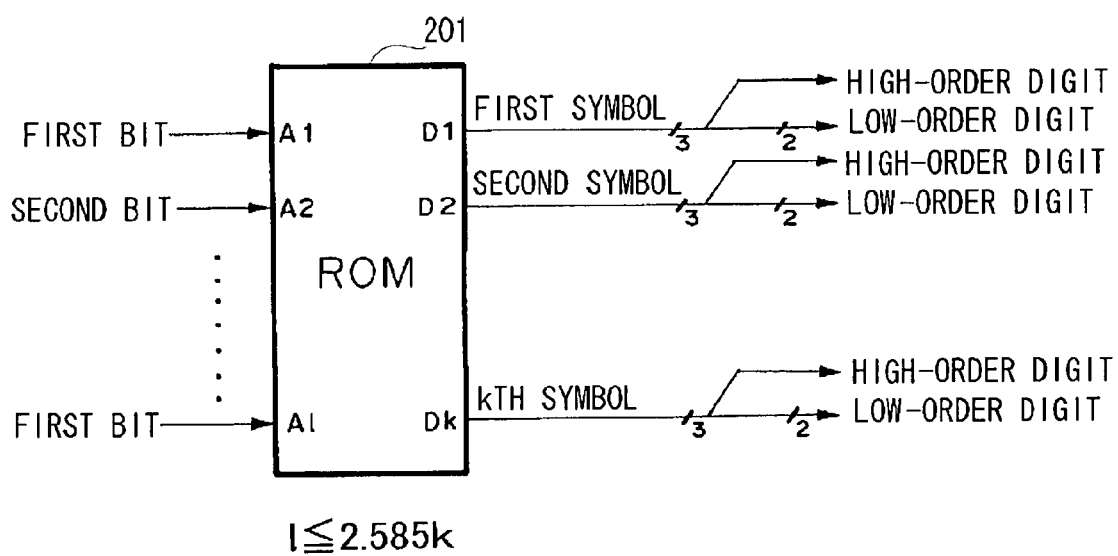
FIG. 2 is a block diagram showing a configuration of a binary to 6-ary circuit according to the embodiment of the present invention.

A specific configuration of the binary to 6-ary conversion circuit 102 will be described. Assuming that the information length of the 6-ary signal is denoted k, the number of values a 6-ary information sequence can take is $6^k$. The 6-ary information sequence is obtained by combining the ternary information sequence and the binary information sequence that is identical to the binary transmits sequence. This value can be expressed as $2^l$ in binary representation. Accordingly, the binary to 6-ary conversion circuit 102 can be implemented with the use of a ROM which receives as an address input a binary signal of the number of bits l of the maximum possible value satisfying $1 \leq k \times \log_2 6 = 2.585k$ and outputs an information sequence as a 6-ary symbol sequence associated with each address. Input/output signals of the ROM 201 are shown in FIG. 2. If the high-order digit and the low-order digit of each symbol are represented by binary number and ternary number, respectively, there are the following six possible values of respective symbols:

(0, 0), (0, 1), (0, 2), (1, 0), (1, 1) and (1, 2)

Since the ROM is constituted by a binary circuit, the high-order digit of each symbol is represented by one bit, while the low-order digit of each symbol is represented by two bits. The high-order digit is supplied to the delay circuit 104, while the low-order digit is supplied to the ternary error correction encoding circuit 103.

A specific configuration of the ternary error correction encoding circuit 103 will be described. The ternary error correction encoding circuit 103 has a well-known configuration illustrated in FIG. 3. In this circuit, an adder and multipliers perform addition and multiplication on a Galois field GF(3), respectively. Rules for addition and multiplication on the Galois field(3)) are as shown in the following tables:

TABLE 1

| Adition | | | |
|---|---|---|---|
| | 0 | 1 | 2 |
| 0 | 0 | 1 | 2 |
| 1 | 1 | 2 | 0 |
| 2 | 2 | 0 | 1 |
| Multiplication | | | |
| | 0 | 1 | 2 |
| 0 | 0 | 0 | 0 |
| 1 | 0 | 1 | 2 |
| 2 | 0 | 2 | 1 |

Figure 4A:
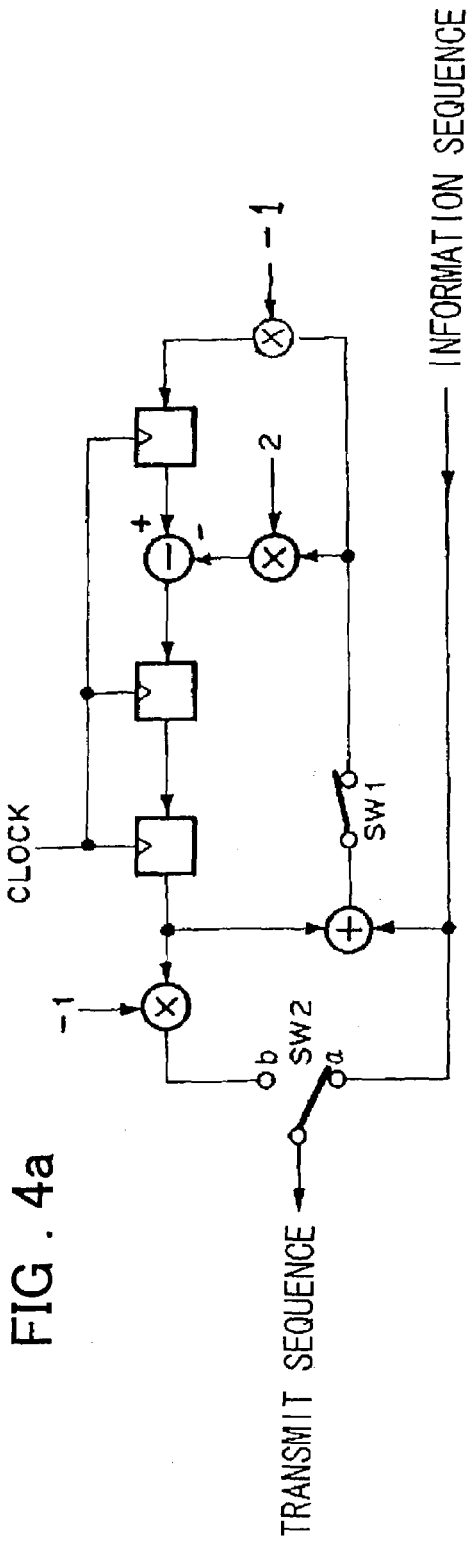
FIG. 4 is a block diagram showing a configuration of the ternary error correction encoding circuit according to the embodiment of the present invention.
Figure 4B:
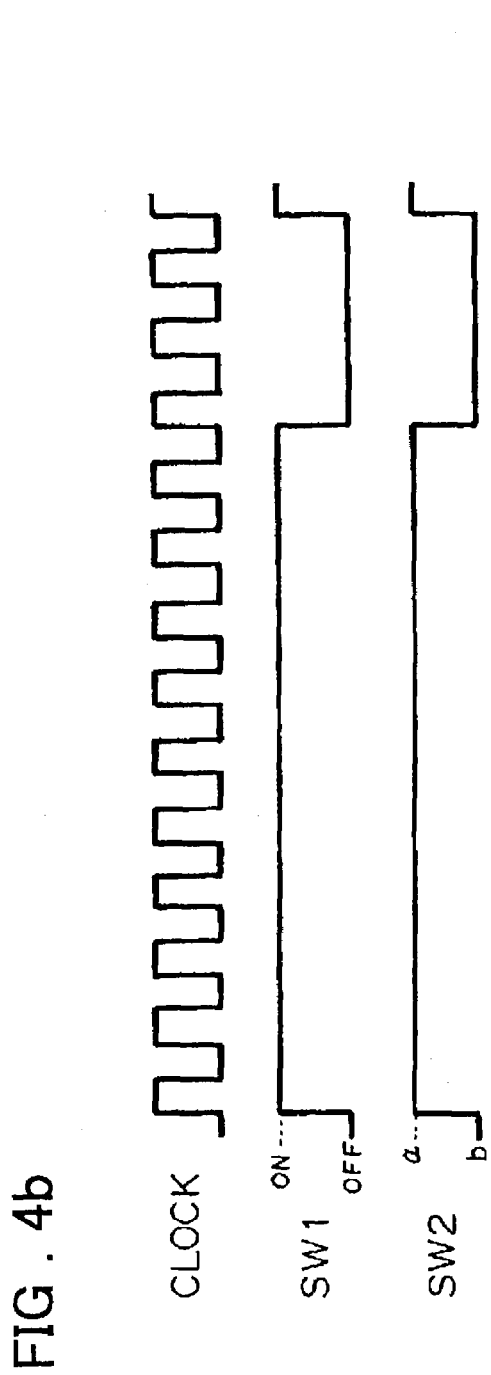

The ternary error correction encoding circuit 103 that uses the Equation (2) as the generating polynomial is as illustrated in FIG. 4a. The ternary error correction encoding circuit in FIG. 4a operates at timing shown in FIG. 4b.

The parity generation circuit 105 will be described. The parity generation circuit 105 performs modulo-three addition as to all symbols in the ternary transmit sequence 134. The parity 135 is generated so that the modulo-three sum of the resulting sum and the parity 135 becomes zero. The calculation rules when the code length of the ternary transmit sequence 134 is 26 will be shown in the following formulas:

$$\sum_{i=1}^{26} d_i = 0 \mod 3 \quad \rightarrow \quad \text{Parity} = 0$$

$$\sum_{i=1}^{26} d_i = 1 \mod 3 \quad \rightarrow \quad \text{Parity} = 2$$

$$\sum_{i=1}^{26} d_i = 2 \mod 3 \quad \rightarrow \quad \text{Parity} = 1$$

where $d_i$ represents a symbol (information symbol or a check symbol) of the ternary transmit sequence.

The parity insertion circuit 106 will be described. Referring to FIG. 5, since three slots in the high-order digit associated with the check symbol in the low-order digit are free, the parity insertion circuit 106 inserts the parity 135 into two of the slots. Alternatively, it may be so arranged that redundancy is provided for the parity 135, so that the parity 135 is represented by three bits. Then, these three bits may be inserted into the three free slots.

Figure 6:
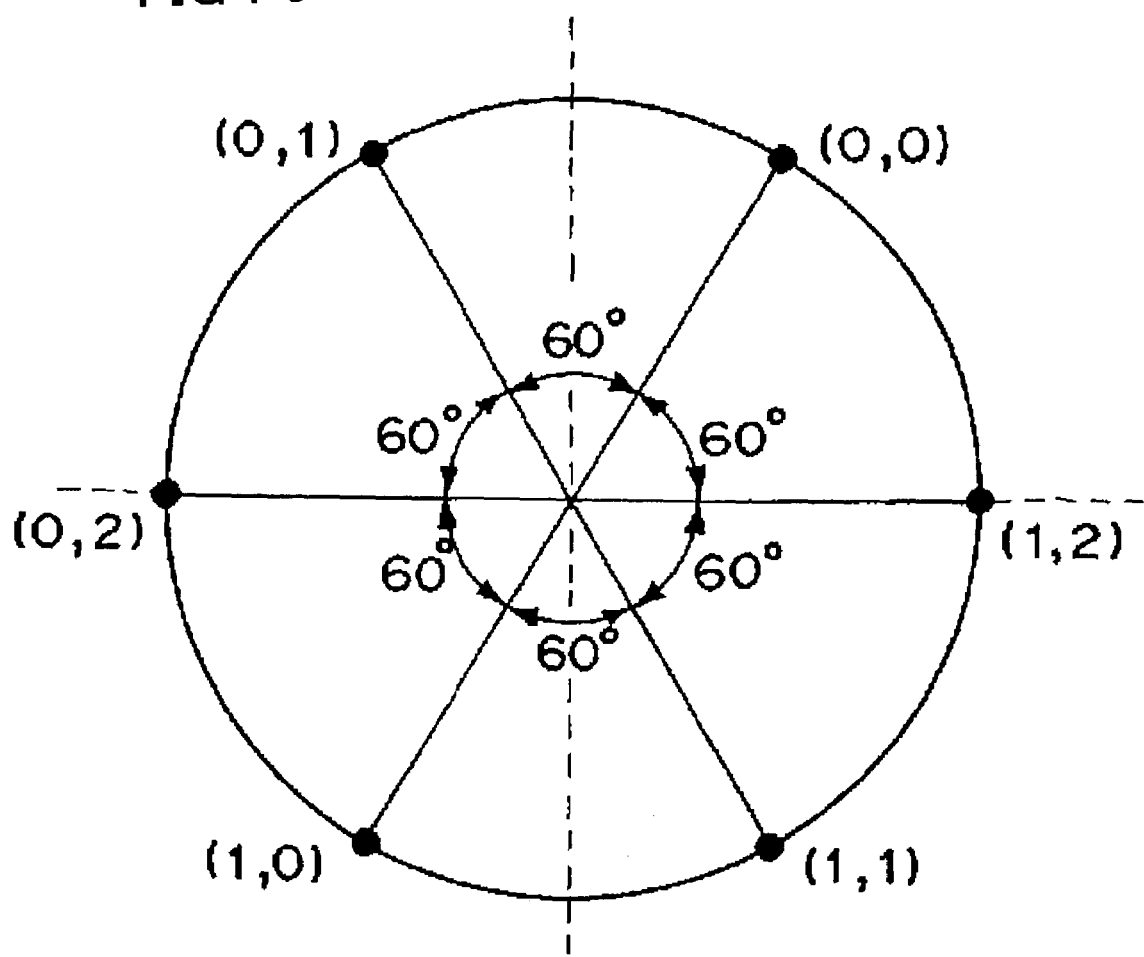
FIG. 6 is a phase plan view showing mapping from a symbol value to an information point on a phase plane during six-phase modulation.
Figure 7:
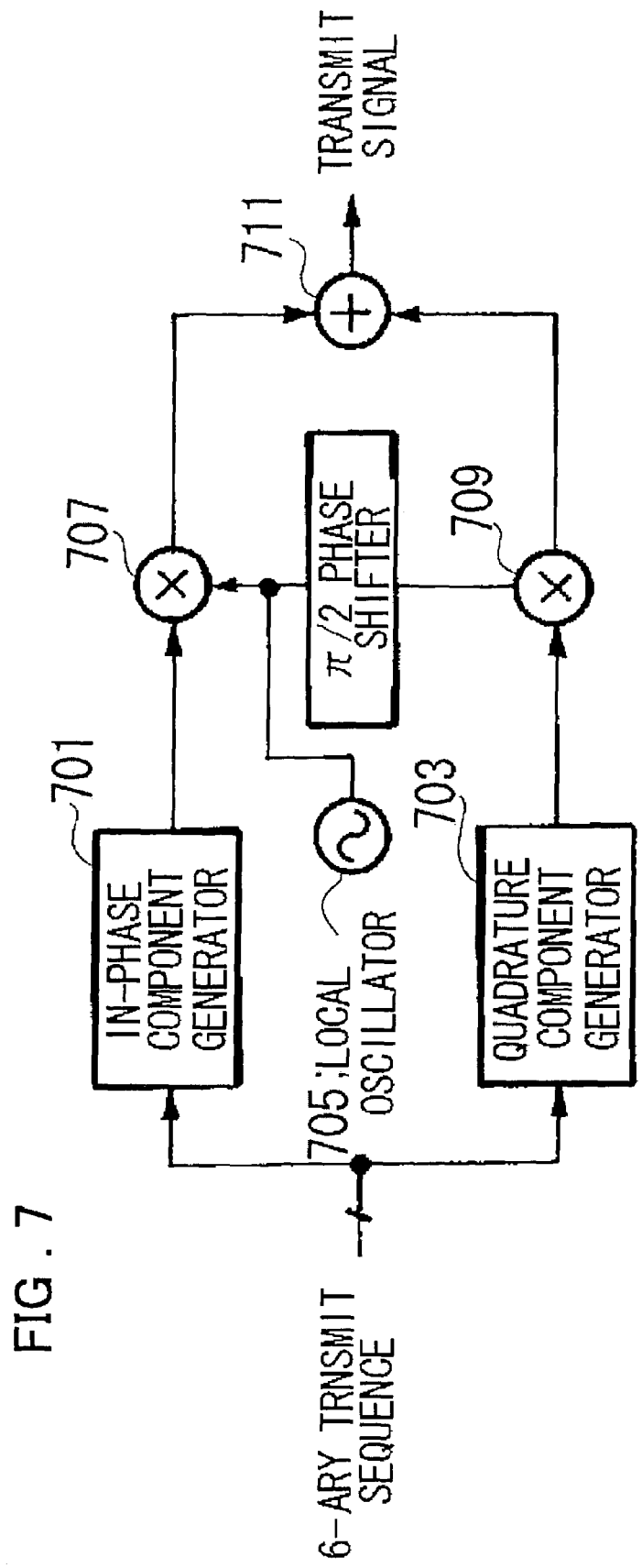
FIG. 7 is a block diagram showing a configuration of a six-phase modulator according to the embodiment of the present invention.

A specific configuration of the six-phase modulator 107 will be described. It is sufficient for the six-phase modulator 107 to perform mapping from a symbol value to an information point on a phase plane. An instance of this mapping will be shown in FIG. 6. Referring to FIG. 6, the symbol value is expressed by the high-order digit in binary representation and the low-order digit in ternary representation, as described above. Accordingly, the six-phase modulator 107 has a configuration as illustrated in FIG. 7, for example. The six-phase modulator 107 comprises an in-phase component generator 701 which receives a 6-ary transmit sequence and generates an in phase component, a quadrature phase component generator 703 which receives the 6-ary transmit sequence and generates a quadrature phase component, a local oscillator 705, a pi/2 phase shifter for applying phase shift by pi/2 to an output of the local oscillator 705, a first multiplier 707 for multiplying the in phase component with a local oscillation signal, a second multiplier 709 for multiplying the quadrature component with a pi/2 phase shifted local oscillation signal, and an adder 711 for adding outputs from the first and second mixers.

Figure 8:
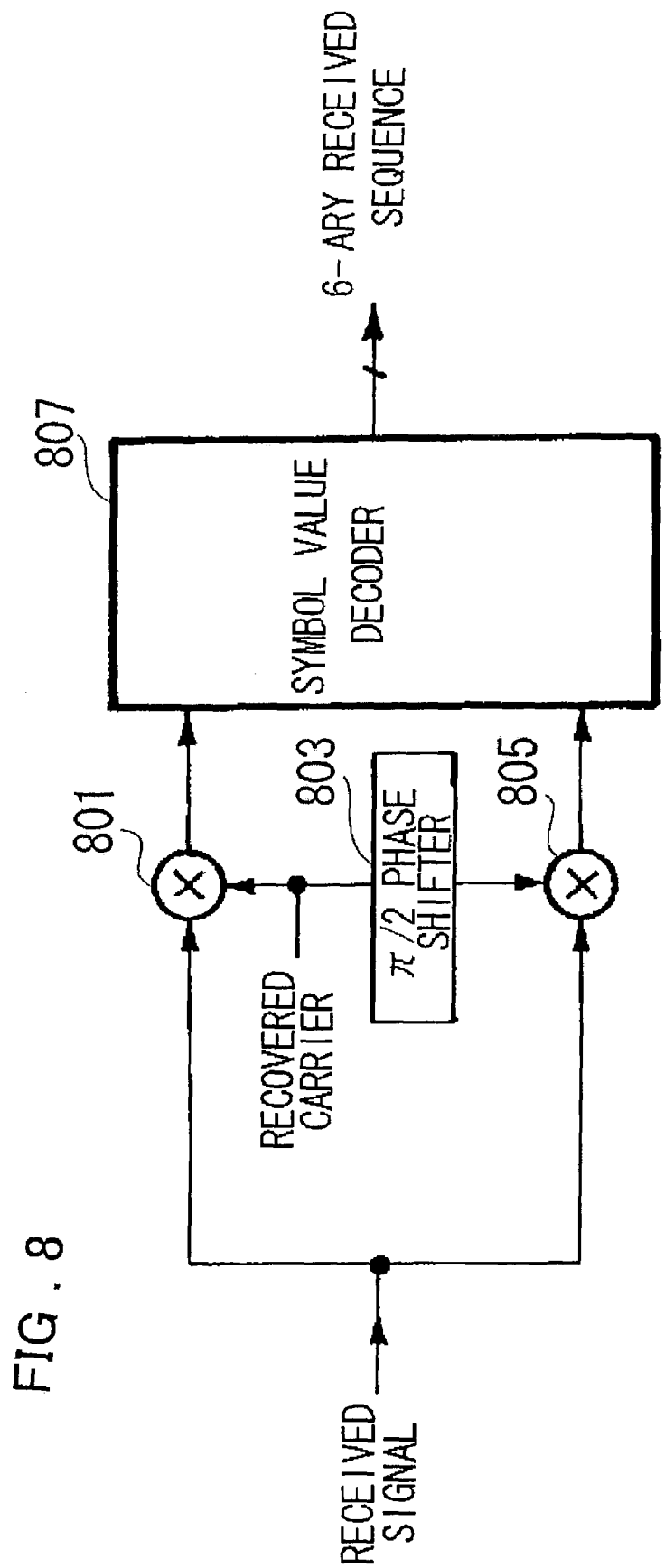
FIG. 8 is a block diagram showing a six-phase demodulator according to the embodiment of the present invention.

A specific configuration of the six-phase demodulator 122 will be described. It is sufficient for the six-phase demodulator 122 to perform mapping from an information point on a phase plane to a symbol value. Accordingly, the six-phase demodulator 122 has a configuration as illustrated in FIG. 8, for example. The six-phase demodulator 122 comprises a pi/2 phase shifter 803 for applying phase shift by pi/2 to a recovered carrier, a first multiplier 801 for multiplying a received signal with the recovered carrier, a second multiplier 805 for multiplying the received signal with a pi/2 phase shifted recovered carrier and a symbol decoder 807 which produces 6-ary received sequence.

The syndrome calculation circuit 123 will be described. The syndrome calculation unit 123 determines a syndrome s={s1, s2, s3} by using an operation $S=yH^T$, where y is the ternary received sequence represented by a vector y={y1, y2, . . . ,y26} and H is a check matrix.

The parity generation circuit 125 will be described. The parity generation circuit 125 performs modulo-three addition of all the symbols of the ternary received sequence 139, and then generates the parity 142 so that modulo-three sum of the resulting sum and the parity 142 becomes zero. The calculation rules when the code length of the ternary received sequence 139 is 26 will be shown in the following formulas:

$$\sum_{i=1}^{26} y_i = 0 \bmod 3 \rightarrow \text{Parity} = 0$$

$$\sum_{i=1}^{26} y_i = 1 \bmod 3 \rightarrow \text{Parity} = 2$$

$$\sum_{i=1}^{26} y_i = 2 \bmod 3 \rightarrow \text{Parity} = 1$$

where $y_i$ represents a symbol of the ternary received sequence 139. $y_i$ is also expressed by an equation $y_i = d_i + e_i$ mod 3, where di represents a symbol of the transmit sequence described above, while $e_i$ represents an error and assumes the value of −1, 0, or 1.

The parity separation circuit 126 will be described. The parity separation circuit 126 separates from the binary received sequence 144 the received parity 143 inserted into the free slots of the binary received sequence 144.

The parity comparison circuit 127 will be described. The parity comparison circuit 127 subtracts the parity 142 calculated by the parity generation circuit 125 from the received parity 143 separated by the parity separation circuit 126. Then, the parity comparison circuit 127 supplies the subtraction result to the low-order digit correction circuit 128 as the parity difference 145. The rules for the subtraction will be shown in the following table.

TABLE 2

| Calculated Parity | Received Parity | | |
|---|---|---|---|
| | 0 | 1 | 2 |
| 0 | 0 | 1 | −1 |
| 1 | −1 | 0 | 1 |
| 2 | 1 | −1 | 0 |

The low-order digit correction circuit 128 will be described. The low-order digit correction circuit 128 corrects an error of the ternary received sequence 139 based on the syndrome 141 and the parity difference 145 to generate and output the ternary decoded sequence 147. A relationship between a combination of a syndrome value and a parity difference value and a combination of an error location and an error value is as shown in the following table:

TABLE 3

| Difference Between Received Parity and Calculated Parity | Syndrome Value | | | (Error Location, Error Value) |
|---|---|---|---|---|
| 1 | 1 | 0 | 0 | (1, 1) |
| 1 | 2 | 0 | 0 | (14, 1) |
| 1 | 0 | 1 | 0 | (2, 1) |
| 1 | 0 | 2 | 0 | (15, 1) |
| 1 | 0 | 0 | 1 | (3, 1) |
| 1 | 0 | 0 | 2 | (16, 1) |
| 1 | 2 | 1 | 0 | (4, 1) |
| 1 | 1 | 2 | 0 | (17, 1) |
| 1 | 0 | 2 | 1 | (5, 1) |
| 1 | 0 | 1 | 2 | (18, 1) |
| 1 | 2 | 1 | 2 | (6, 1) |
| 1 | 1 | 2 | 1 | (19, 1) |
| 1 | 1 | 1 | 1 | (7, 1) |
| 1 | 2 | 2 | 2 | (20, 1) |
| 1 | 2 | 2 | 1 | (8, 1) |
| 1 | 1 | 1 | 2 | (21, 1) |
| 1 | 2 | 0 | 2 | (9, 1) |
| 1 | 1 | 0 | 1 | (22, 1) |
| 1 | 1 | 1 | 0 | (10, 1) |
| 1 | 2 | 2 | 0 | (23, 1) |
| 1 | 0 | 1 | 1 | (11, 1) |
| 1 | 0 | 2 | 2 | (24, 1) |
| 1 | 2 | 1 | 1 | (12, 1) |
| 1 | 1 | 2 | 2 | (25, 1) |
| 1 | 2 | 0 | 1 | (13, 1) |
| 1 | 1 | 0 | 2 | (26, 1) |
| −1 | 1 | 0 | 0 | (14, −1) |
| −1 | 2 | 0 | 0 | (1, −1) |
| −1 | 0 | 1 | 0 | (15, −1) |
| −1 | 0 | 2 | 0 | (2, −1) |
| −1 | 0 | 0 | 1 | (16, −1) |
| −1 | 0 | 0 | 2 | (3, −1) |
| −1 | 2 | 1 | 0 | (17, −1) |
| −1 | 1 | 2 | 0 | (4, −1) |
| −1 | 0 | 2 | 1 | (18, −1) |
| −1 | 0 | 1 | 2 | (5, −1) |
| −1 | 2 | 1 | 2 | (19, −1) |
| −1 | 1 | 2 | 1 | (6, −1) |
| −1 | 1 | 1 | 1 | (20, −1) |
| −1 | 2 | 2 | 2 | (7, −1) |
| −1 | 2 | 2 | 1 | (21, −1) |
| −1 | 1 | 1 | 2 | (8, −1) |
| −1 | 2 | 0 | 2 | (22, −1) |
| −1 | 1 | 0 | 1 | (9, −1) |
| −1 | 1 | 1 | 0 | (23, −1) |
| −1 | 2 | 2 | 0 | (10, −1) |
| −1 | 0 | 1 | 1 | (24, −1) |
| −1 | 0 | 2 | 2 | (11, −1) |
| −1 | 2 | 1 | 1 | (25, −1) |
| −1 | 1 | 2 | 2 | (12, −1) |
| −1 | 2 | 0 | 1 | (26, −1) |
| −1 | 1 | 0 | 2 | (13, −1) |

As clear from the above table, the syndrome when the error with the value "1" has occurred to the ith symbol and the syndrome when the error with the value "−1" has occurred to the (i+13) mod 13 th symbol are identical. Thus, if the parity difference value (difference between a received parity and a calculated parity) is unknown, these errors cannot be discriminated. Accordingly, in the conventional technique where information on the parity difference value is not supplied to the low-order digit correction circuit 128, the code length is set to 13, thereby preventing occurrence of the identical syndrome for two types of errors. Contrary to the conventional technique, according to the present invention, the information on the parity difference value is supplied to the low-order digit correction circuit 128. Thus, these errors can be discriminated. Hence, according to the present invention, the code length can be set to 26. The number of check symbols is three in both cases. Thus, redundancy can be reduced more in the present invention than in the conventional technique.

Figure 9:
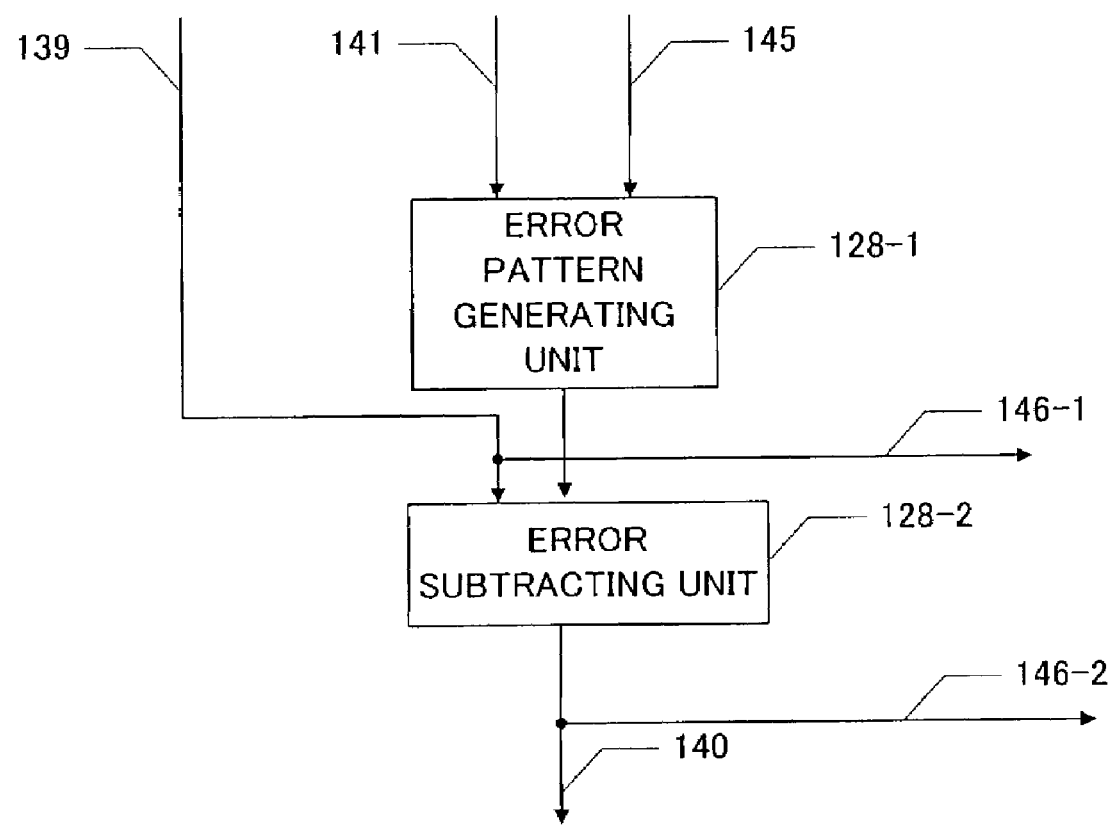
FIG. 9 is a block diagram showing a specific configuration of a low-order digit correction circuit 128 according to the embodiment of the present invention.

Specifically, as shown in FIG. 9, the low-order digit correction circuit 128 is constituted by an error pattern generating unit 128-1 and an error-subtracting unit 128-2. The error pattern-generating unit 128-1 performs mapping of a combination of a syndrome value and a parity difference value in the above Table into an error location and an error value, thereby generating an error pattern according to the error location and the error value. The error-subtracting unit 128-2 subtracts the error pattern from the ternary received sequence 139, thereby generating the ternary decoded sequence 147. Incidentally, the ternary received sequence 139 before subtraction and the ternary decoded sequence 147 after subtraction are supplied to the high-order digit correction circuit 129 as the ternary received sequence 146-1 and the ternary decoded sequence 146-2, respectively.

The high-order digit correction circuit 129 will be described. Considering the probability of occurrence of an error with the value "1" or "−1" on the phase plane is much higher than the probability of occurrence of an error with the value "2", assume that when an error has occurred, the error value is always "1 " or "−1". Then, the best error correction result can be obtained. Under this assumption, the high-order digit correction circuit 129 corrects the high-order digit of a received symbol according to the contents of correction of its low-order digit based on the phase plane illustrated in FIG. 6, as follows:

(1) When the received symbol is (0, 0) and correction of the low-order digit of the received symbol has not been performed by the low-order digit correction circuit 128, it is presumed that no error has occurred. Thus, correction of the high-order digit of the received symbol is not performed, either. As a result, the decoded symbol becomes (0, 0).

(2) When the received symbol is (0, 0) and the low-order digit of the received symbol has been corrected from 0 to 1 by the low-order digit correction circuit 128, it is presumed that an error with the error value of "−1" has occurred. Thus, correction of the high-order digit of the received symbol is not performed. As a result, the decoded symbol becomes (0, 1).

Figure 10:
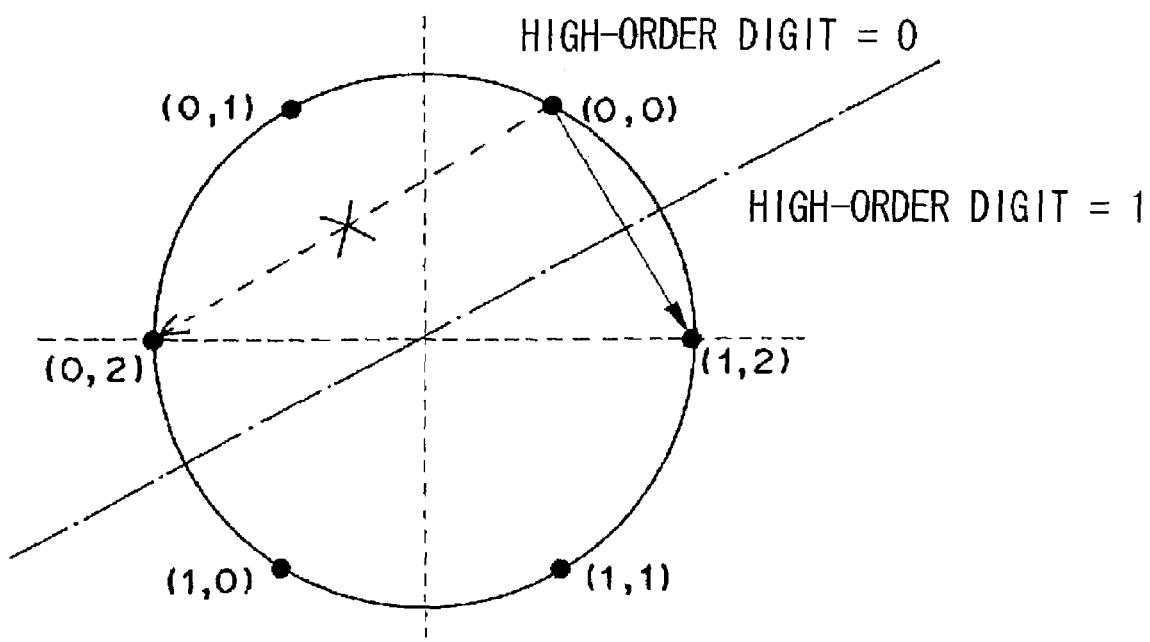
FIG. 10 is a phase plan view for explaining a symbol error correction method according to the embodiment of the present invention.

(3) When the received symbol is (0, 0) and the low-order digit of the received symbol has been corrected from 0 to 2 by the low-order digit correction circuit 128, it is presumed that an error with the value "1" has occurred. Thus, the high-order digit is corrected from 0 to 1. That is, as shown in FIG. 10, if the low-order digit has been corrected from 0 to 2 and the high-order digit is not corrected, the corrected symbol is changed to a symbol being different by 2. By correcting the low-order digit from 0 to 2 and then by correcting the high-order digit from 0 to 1, the corrected symbol is changed to a symbol being different by 1. As a result, the decoded symbol becomes (1, 2).

(4) When the received symbol is (0, 1) and correction of the low-order digit by the low-order digit correction circuit 128 has not been performed, it is concluded that no error has occurred. Thus, correction of the high-order digit is not performed, either. As a result, the decoded symbol becomes (0, 1).

(5) When the received symbol is (0, 1) and the low-order digit of the received symbol has been corrected from 1 to 0 by the low-order digit correction circuit 128, it is presumed that an error with the value "1" has occurred. Thus, the high-order digit is not corrected. As a result, the decoded symbol becomes (0, 0).

(6) When the received symbol is (0, 1) and the low-order digit of the received symbol has been corrected by the low-order digit correction circuit 128, it is presumed that an error with the value "−1" has occurred. Thus, the high-order digit is not corrected. As a result, the decoded symbol becomes (0, 2).

(7) When the received symbol is (0, 2) and the low-order digit of the received symbol has not been corrected by the low-order digit correction circuit 128, it is presumed that no error has occurred. The high-order digit is not corrected, either. As a result, the decoded symbol becomes (0, 2).

(8) When the received symbol is (0, 2) and the low-order digit of the received symbol has been corrected from 2 to 0 by the low-order digit correction circuit 128, it is presumed that an error with the value "−1" has occurred. Thus, the high-order digit is corrected from 0 to 1. As a result, the decoded symbol becomes (1, 0).

(9) When the received symbol is (0, 2) and the low-order digit of the received symbol has been corrected from 2 to 1 by the low-order digit correction circuit 128, it is presumed that an error with the value "1" has occurred. Thus, the high-order digit is not corrected. As a result, the decoded symbol becomes (0, 1).

(10) When the received symbol is (1, 0) and the low-order digit of the received symbol has not been corrected by the low-order digit correction circuit 128, it is presumed that no error has occurred. Thus, the high-order digit is not corrected, either. As a result, the decoded symbol becomes (1, 0).

(11) When the received symbol is (1, 0) and the low-order digit has been corrected from 0 to 1 by the low-order digit correction circuit 128, it is presumed that an error with the value "−1" has occurred. Thus, the high-order digit is not corrected. As a result, the decoded symbol becomes (1, 1).

(12) When the received symbol is (1, 0) and the low-order digit has been corrected from 0 to 2 by the low-order digit correction circuit 128, it is concluded that an error with the value "1" has occurred. Thus, the high-order digit is corrected from 1 to 0. As a result, the decoded symbol becomes (0, 2).

(13) When the received symbol is (1, 1) and the low-order digit of the received symbol has not been corrected by the low-order digit correction circuit 128, it is concluded that no error has occurred. Thus, the high-order digit is not corrected, either. As a result, the decoded symbol becomes (1, 1).

(14) When the received symbol is (1, 1) and the low-order digit of the received symbol has been corrected from 1 to 0 by the low-order digit correction circuit 128, it is concluded that an error with the value "1" has occurred. Thus, the high-order digit is not corrected. As a result, the decoded symbol becomes (1, 0).

(15) When the received symbol is (1, 1) and the low-order digit of the received symbol has been corrected from 1 to 2 by the low-order digit correction circuit 128, it is concluded that an error with the value "−1" has occurred. Thus, the high-order digit is not corrected. As a result, the decoded symbol becomes (1, 2).

(16) When the received symbol is (1, 2) and the low-order digit of the received symbol is not corrected by the low-order digit correction circuit 128, it is concluded that no error has occurred. Thus, the high-order digit is not corrected, either. As a result, the decoded symbol becomes (1, 2).

(17) When the received symbol is (1, 2) and the low-order digit of the received symbol has been corrected from 2 to 0 by the low-order digit correction circuit 128, it is concluded that an error with the value "−1" has occurred. Thus, the high-order digit is corrected from 1 to 0. As a result, the decoded symbol becomes (0, 0).

(18) When the received symbol is (1, 2) and the low-order digit of the received symbol has been corrected from 2 to 1 by the low-order digit correction circuit 128, it is concluded that an error with the value "1" has occurred. Thus, the high-order digit is not corrected. As a result, the decoded symbol becomes (1, 1).

The contents of corrections described above are summarized in the table listed below, as follows:

TABLE 4

| Received Symbol | Lower-order Digit After Correction | Decoded Symbol |
|---|---|---|
| (0, 0) | 0 | (0, 0) |
| (0, 0) | 1 | (0, 1) |
| (0, 0) | 2 | (1, 2) |
| (0, 1) | 0 | (0, 0) |
| (0, 1) | 1 | (0, 1) |
| (0, 1) | 2 | (0, 2) |
| (0, 2) | 0 | (1, 0) |
| (0, 2) | 1 | (0, 1) |
| (0, 2) | 2 | (0, 2) |
| (1, 0) | 0 | (1, 0) |
| (1, 0) | 1 | (1, 1) |
| (1, 0) | 2 | (0, 2) |
| (1, 1) | 0 | (1, 0) |
| (1, 1) | 1 | (1, 1) |
| (1, 1) | 2 | (1, 2) |
| (1, 2) | 0 | (0, 0) |
| (1, 2) | 1 | (1, 1) |
| (1, 2) | 2 | (1, 2) |

As is clear from this table, the high-order digit correction circuit 129 inverts the high-order digit of a received symbol when the low-order digit of the received symbol has been corrected from 2 to 0, or from 0 to 2 by the low-order digit correction circuit 128. Otherwise, the high-order digit of the received symbol is not inverted. In order to obtain information on whether the low-order digit of the received symbol has been corrected from 2 to 0, or from 0 to 2, the high-order digit correction circuit 129 receives the ternary received sequence 146-1 and the ternary decoded sequence 146-2 from the low-order digit correction circuit 128.

A specific configuration of the 6-ary to binary conversion circuit 130 will be described. If the information length of the 6-ary signal is denoted k, the number of possible values of the 6-ary decoded sequence combining the ternary decoded sequence and the binary decoded sequence becomes $6^k$. This value may be expressed as $2^l$ in binary notation. Accordingly, the 6-ary to binary conversion circuit 130 can be implemented with the use of a ROM which receives an address input a 6-ary decoded sequence constituted by k symbols and outputs a binary signal of the number of bits l of the maximum possible value satisfying $1 \leq k \times \log_2 6 = 2.585k$ as data. Input/output signals of the ROM will be illustrated in FIG. 11. High order digit and low order digit of a first symbol to high order digit and low order digit of a k th symbol are provided to a address input terminals A1 and A2~3, to A3k-2 and A3k-1~3k of the ROM which has l bit data terminals D1 to Dl.

As described above, three types of parities calculated by the parity generation circuit 105 may also be represented by a three-bit binary signal for insertion into a high-order binary signal at the parity insertion circuit 106. With this arrangement, a difference not less than 2 can be provided between adjacent parity values. Based on this, before a comparison between a parity separated by the parity separation circuit 126 and a parity calculated by the parity generation circuit 125 is made, error detection or correction of the parity separated by the parity separation circuit 126 may also be performed.

Figure 12:
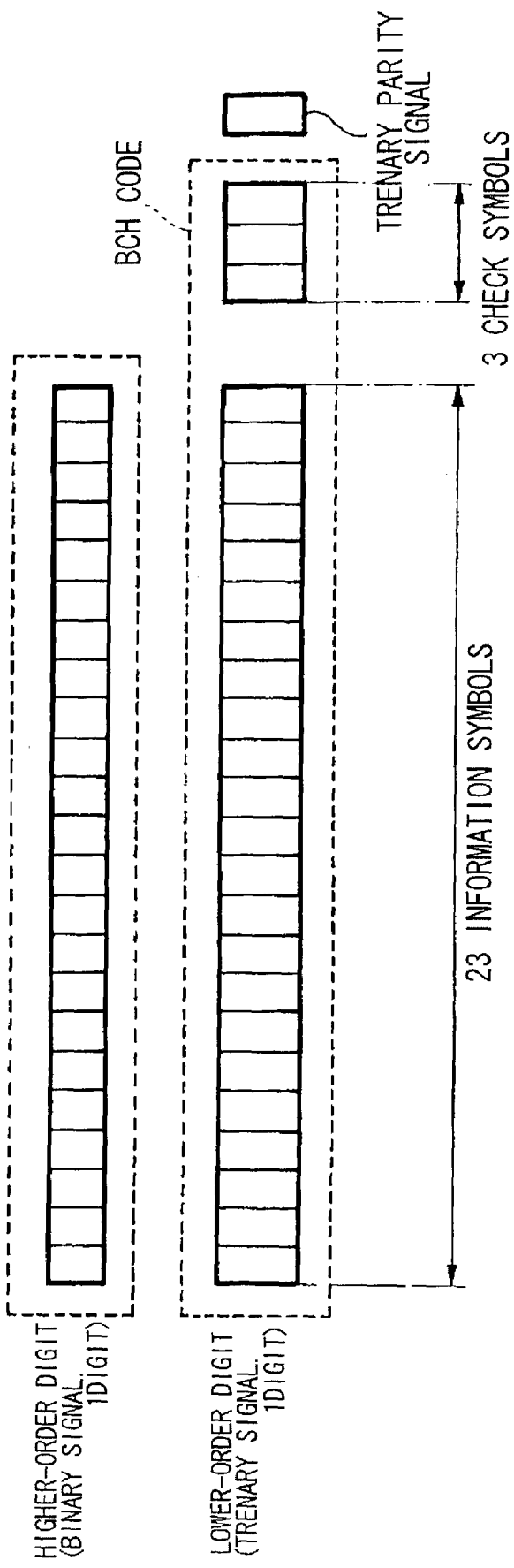
FIG. 12 are diagrams showing a configuration of a transmit sequence according to a second embodiment of the present invention.

Another embodiment of the present invention will now be described. Instead of inserting a parity for the BCH code into free slots in the high-order digit as illustrated in FIG. 5, a parity slot for the BCH code may be inserted into the low-order digit, as illustrated in FIG. 12. Configurations of a transmitting apparatus and a receiving apparatus in this case will be illustrated in FIG. 13.

Figure 13:
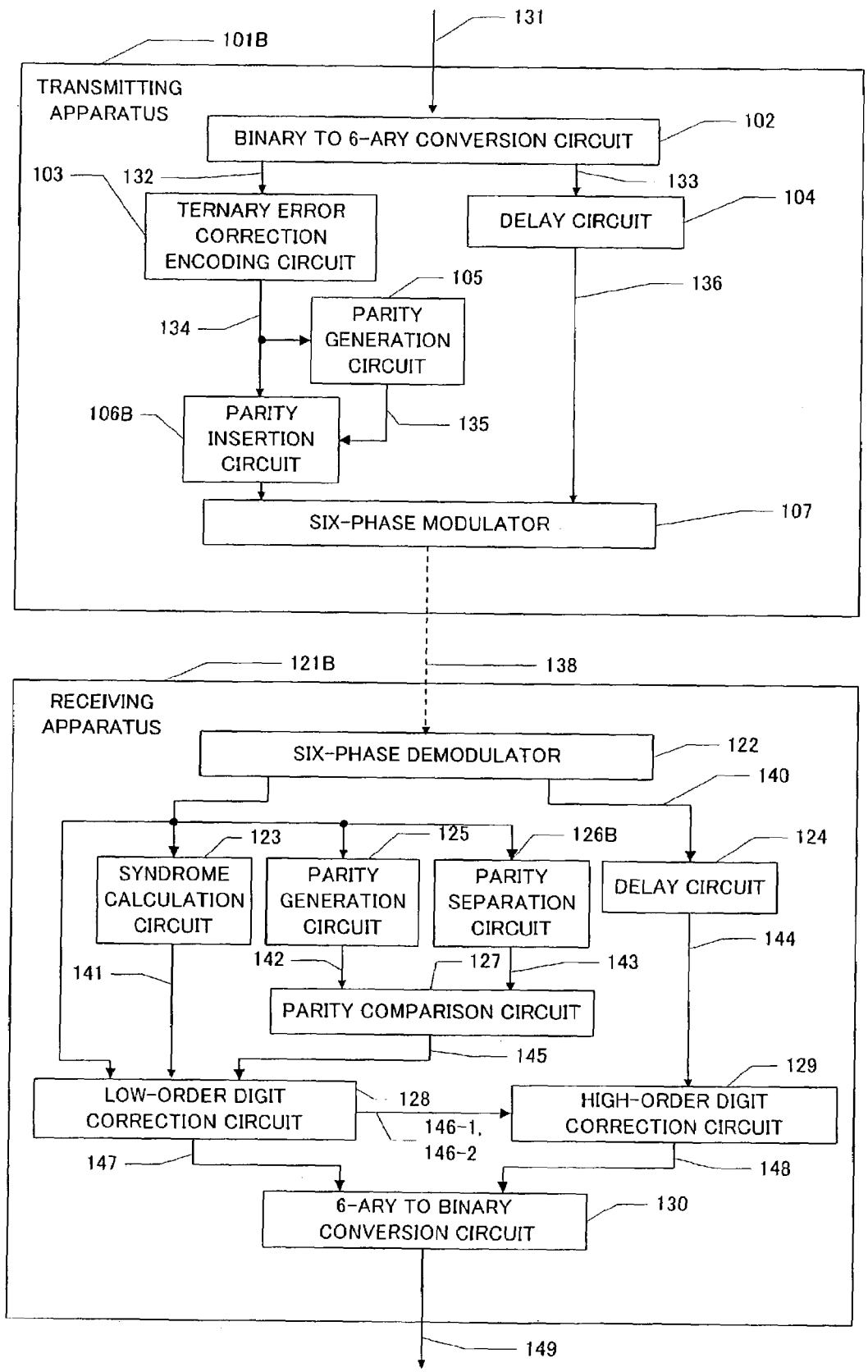
FIG. 13 is a block diagram showing a configuration of a communication system according to the second embodiment of the present invention.

A difference between a transmitting apparatus 101B illustrated in FIG. 13 and the transmitting apparatus 101 illustrated in FIG. 1 is that the parity insertion circuit 106 is deleted and that a parity insertion circuit 106B is provided between the ternary error correction encoding circuit 103 and the six-phase modulator 107 in place of the parity insertion circuit 106.

A difference between a receiving apparatus 121B illustrated in FIG. 13 and the receiving apparatus 121 illustrated in FIG. 1 is that the parity separation circuit 126 is deleted and that a parity separation circuit 126B for separating a received parity from the ternary received sequence 139 is provided between the six-phase demodulator 122 and the parity comparison circuit 127 in place of the parity separation circuit 126.

Another embodiment of the present invention will now be described. In the embodiments described above, a description is directed to the case where six-phase modulation of a 6-ary signal of which the high-order digit is a binary value and the low-order digit is a ternary value is performed. Different notation of the high-order digit may also be employed.

Figure 14:
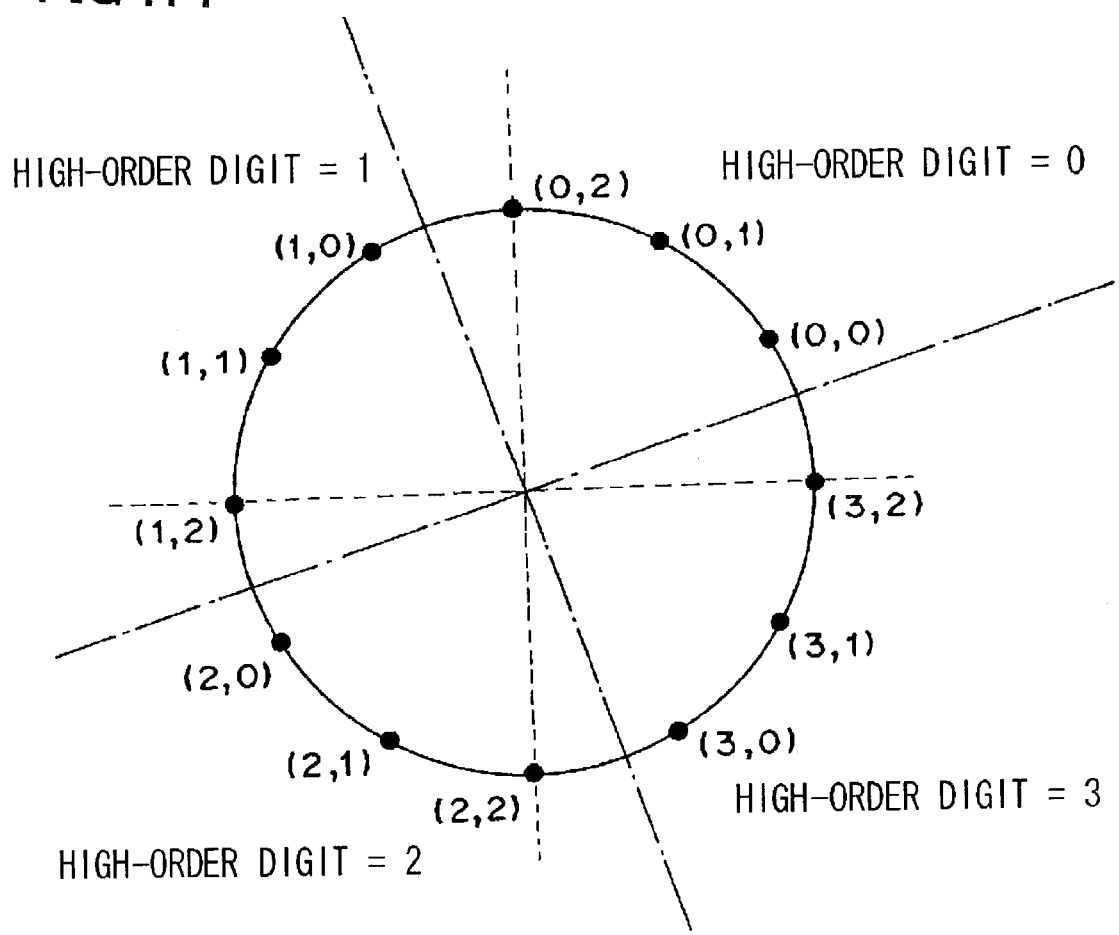
FIG. 14 is a phase plan view for explaining a phase modulation system according to other embodiment of the present invention.

As illustrated in FIG. 14, for example, 4-nary value and ternary value may also be employed for the high-order digit and the low-order digit, respectively. In this case, a relationship among a received symbol, a low-order digit after correction, and a decoded symbol is as shown in the following table.

TABLE 5

| Received Symbol | Low-order Digit After Correction | Decoded Symbol |
|---|---|---|
| (0, 0) | 0 | (0, 0) |
| (0, 0) | 1 | (0, 1) |
| (0, 0) | 2 | (3, 2) |
| (0, 1) | 0 | (0, 0) |
| (0, 1) | 1 | (0, 1) |
| (0, 1) | 2 | (0, 2) |
| (0, 2) | 0 | (1, 0) |
| (0, 2) | 1 | (0, 1) |
| (0, 2) | 2 | (0, 2) |
| (1, 0) | 0 | (1, 0) |
| (1, 0) | 1 | (1, 1) |
| (1, 0) | 2 | (0, 2) |
| (1, 1) | 0 | (1, 0) |
| (1, 1) | 1 | (1, 1) |
| (1, 1) | 2 | (1, 2) |
| (1, 2) | 0 | (2, 0) |
| (1, 2) | 1 | (1, 1) |
| (1, 2) | 2 | (1, 2) |
| (2, 0) | 0 | (2, 0) |
| (2, 0) | 1 | (2, 1) |
| (2, 0) | 2 | (1, 2) |
| (2, 1) | 0 | (2, 0) |
| (2, 1) | 1 | (2, 1) |
| (2, 1) | 2 | (2, 2) |
| (2, 2) | 0 | (3, 0) |
| (2, 2) | 1 | (2, 1) |

TABLE 5-continued

| Received Symbol | Low-order Digit After Correction | Decoded Symbol |
|---|---|---|
| (2, 2) | 2 | (2, 2) |
| (3, 0) | 0 | (3, 0) |
| (3, 0) | 1 | (3, 1) |
| (3, 0) | 2 | (2, 2) |
| (3, 1) | 0 | (3, 0) |
| (3, 1) | 1 | (3, 1) |
| (3, 1) | 2 | (3, 2) |
| (3, 2) | 0 | (0, 0) |
| (3, 2) | 1 | (3, 1) |
| (3, 2) | 2 | (3, 2) |

As described above, according to the present invention, when the ternary error correction code is applied to six-phase modulation, the direction of an error is derived from a parity difference. Thus, the following effect is obtained. The ternary BCH code is formed on the basis of the p-degree generating polynomial having three coefficients of 0, 1, and 2. If the direction of the error is unknown, the code length becomes $(3^p-1)/2$. On the other hand, if the error direction is known, the code length becomes $3^p-1$. In both cases, generally, the information length k becomes $k=n-t·p$, and redundancy becomes $(n-k)/n$ when t-fold error correction is performed. That is, in the former case, redundancy is doubled, compared with the latter case. It is desirable for a communication path with a limited bandwidth to have low redundancy. In the one-fold error correction ternary BCH code generated by the generating polynomial given by Equation 2, the code length becomes 26, information length becomes 23, and the check matrix H becomes the one given by Equation 3.

Figure 15:
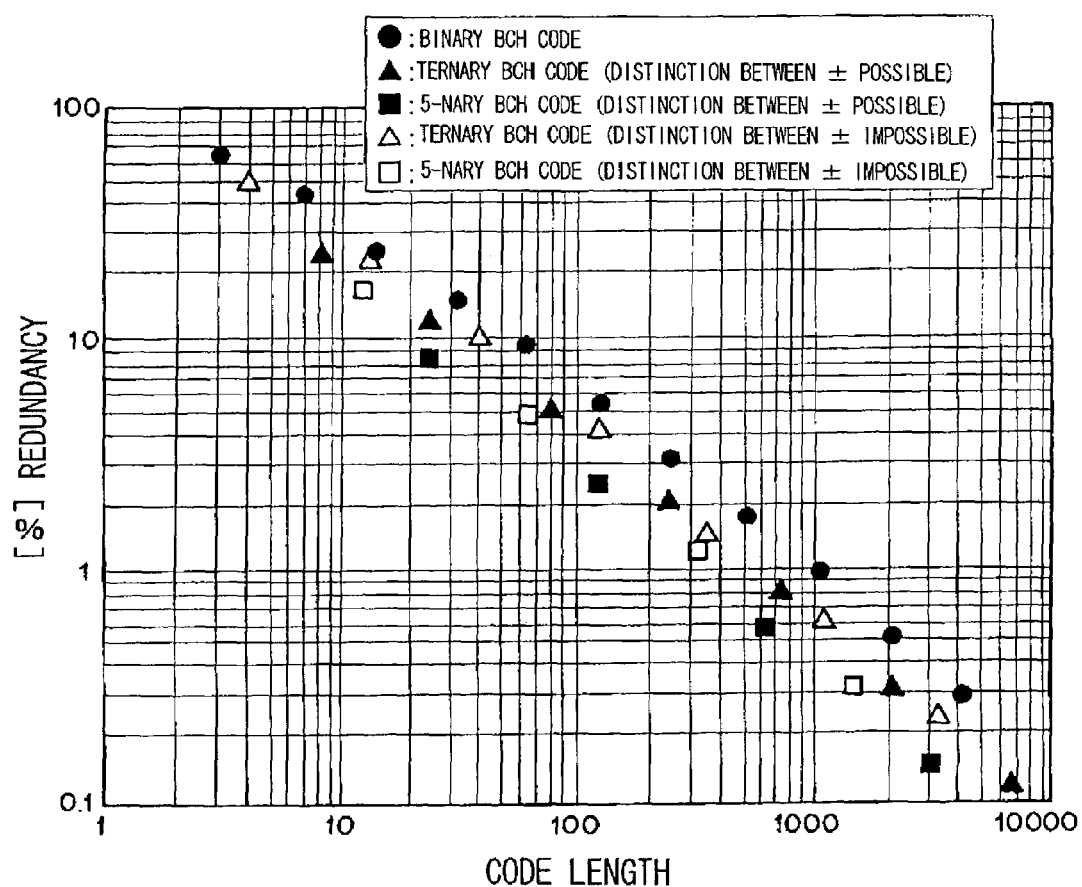
FIG. 15 is a graph for explaining an effect of the present invention, showing a relationship between the code length and redundancy of respective BCH codes.
Figure 16:
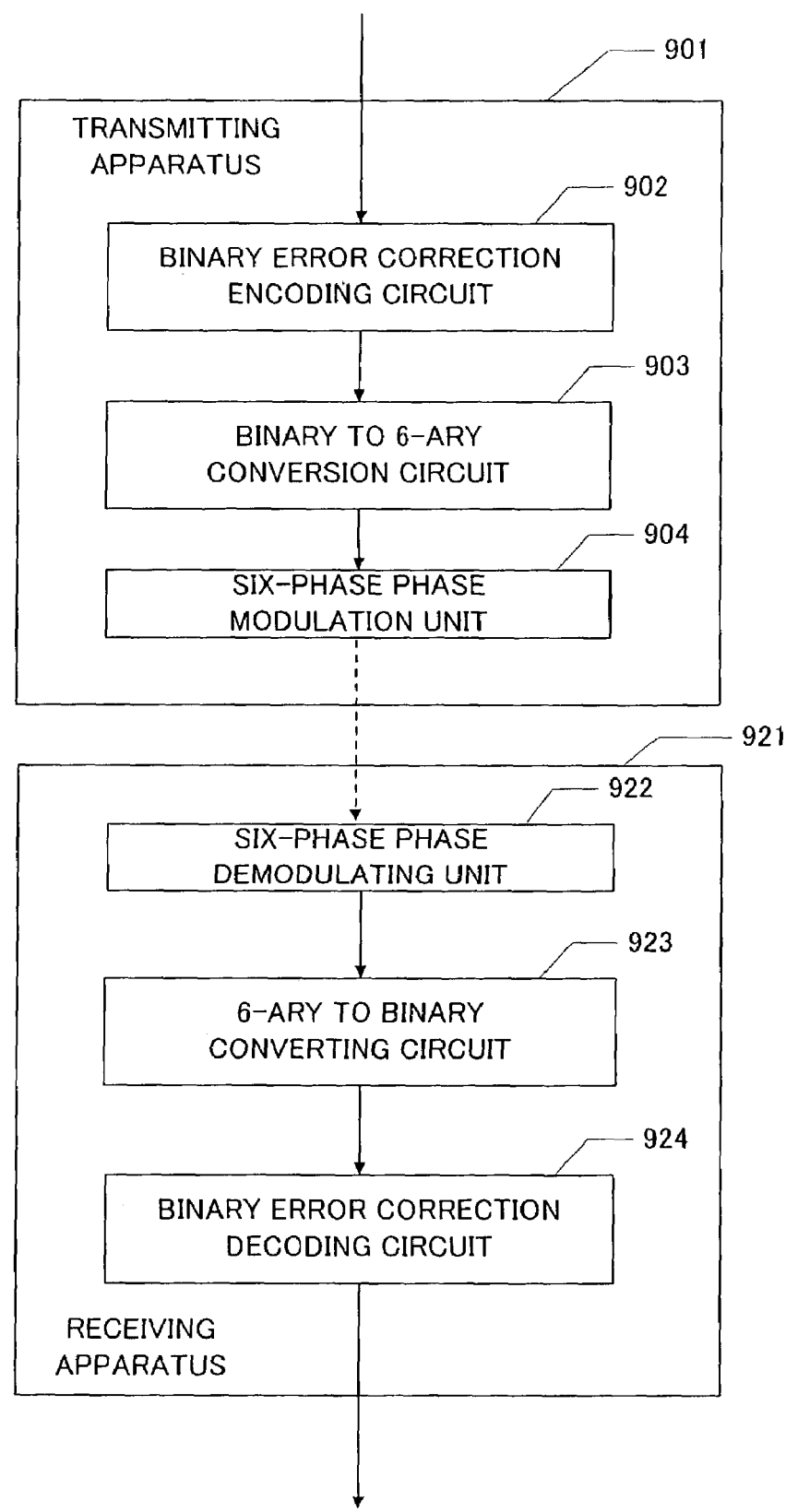
FIG. 16 is a block diagram showing a configuration of a communication system according to a conventional technique (a prior art)

Further, since the ternary error correction code is employed, a feature can be obtained which could not be obtained when the binary error correction code was applied. That is, as shown in FIG. 15 that plots binary, ternary, and 5-nary BCH codes and redundancy, it can be found that, for substantially the equivalent redundancy, the code length of the nonbinary error correction codes is shorter than the code length of the binary error correction code. The equivalent redundancy but the shorter code length mean that, if the equivalent redundancy is given, the nonbinary error correction code is superior to the binary error correction code in error correction ability. Generally, in the one-fold error correction, if the error rate of a symbol is denoted p and the error rate is sufficiently small for the reciprocal of the code length, the error rate of the symbol after correction roughly becomes $(3/2) \times (n-1) \times p^2$. Accordingly, the error correction code with the shorter code length is superior in its error rate.

In six-phase modulation, C/N values of 13.7 dB, 16.7 dB, and 19.0 dB are required for realizing the error rate of $10^{-6}$ for QPSK, 6PSK, and 8PSK, respectively. The relative required band is 1.0, 0.8, and 0.66 for QPSK, 6PSK, and 8PSK, respectively. 8PSK has hitherto been employed as a modulation system having a better efficiency of the use of frequencies than QPSK. In this system, the relative required band was reduced from 1.0 to 0.66, thereby achieving higher efficiency. However, in order to achieve the required C/N, 5.3 dB (=19.0–13.7) dB was additionally required. However, by applying the technique of six-phase modulation, the relative required frequency band can be reduced from 1.0 to 0.8, thereby achieving higher efficiency. Further, for enabling achievement of the required C/N, additional 3.0 (=16.7–13.7) dB suffices. According to the present invention, an encoding gain of 2 to 3 dB can also be obtained.

Thus, compared with QPSK, by increasing the required C/N by a little less than 1 dB, the frequency band can be efficiently reduced by approximately 20%.

Figure 17:
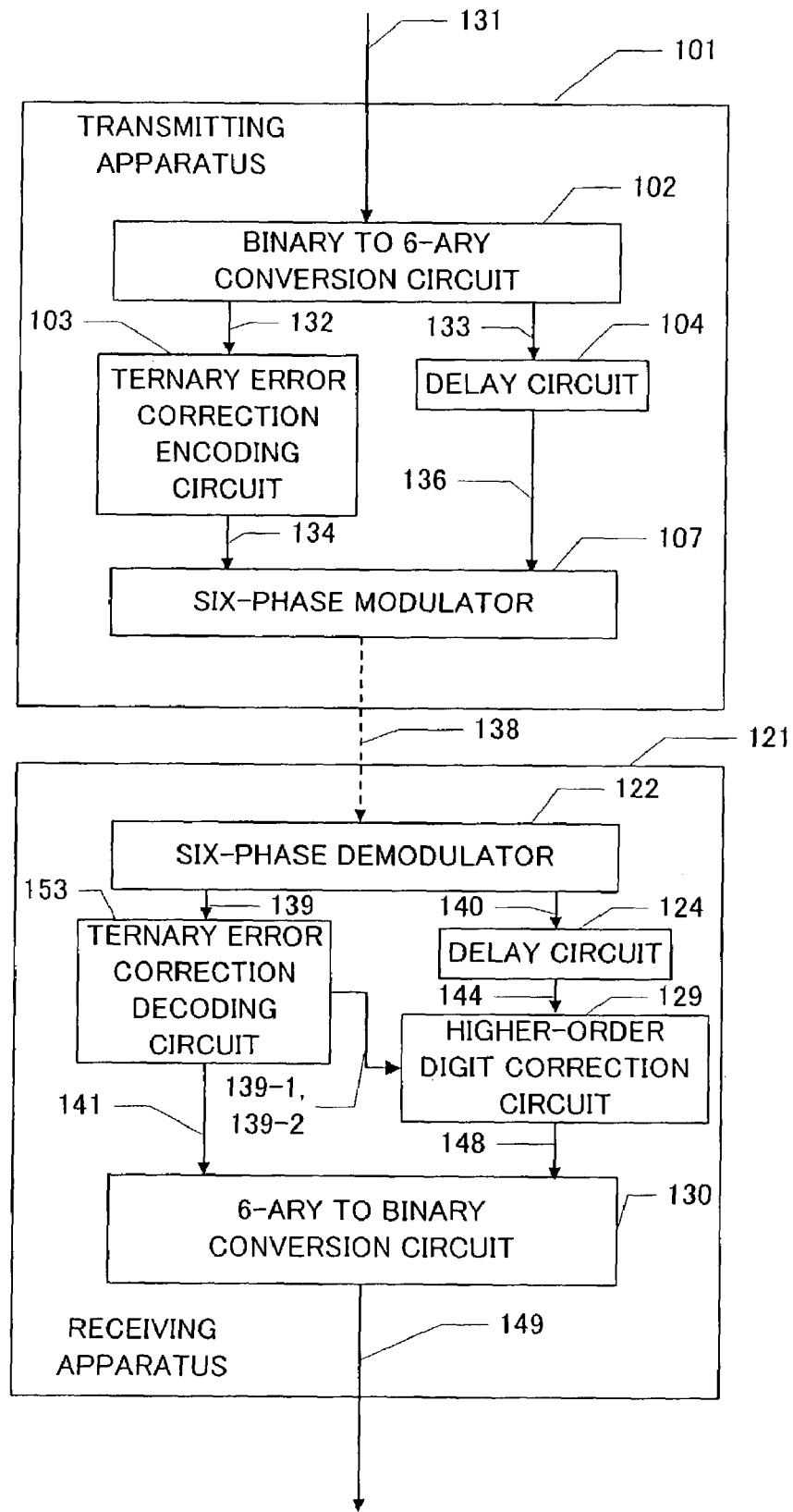
FIG. 17 is a block diagram showing a configuration of a communication system according to the other embodiment of the present invention.

A further embodiments of the present invention will be described with reference to drawings. FIG. 17 is a diagram illustrating a structure of a communication system according to an embodiment of the present invention. In FIG. 17, elements corresponding to those in FIG. 1 are allotted the same reference numerals. Referring to FIG. 17, a binary transmission signal 131 in a transmitting apparatus 101 is supplied to a binary to 6-ary conversion circuit 102.

This binary 6-ary converting circuit 102 converts a binary input signal to a 6-ary signal. This 6-ary signal is made up by a ternary low-order signal and a binary high-order signal. The ternary low-order signal is sent as a ternary information sequence 132 to a ternary error correction encoding circuit 103, while the binary high-order signal is sent as a binary transmission sequence 133 to a delay circuit 104. The ternary error correction encoding circuit 103 performs ternary error correction and encoding on the ternary information sequence 132, based on the ternary error correction code, to generate a ternary transmission sequence 134. The ternary transmission sequence 134 is supplied to a six-phase phase modulation unit 107. On the other hand, the binary transmission sequence 133 is delayed by a delay circuit 104 by a time corresponding to the delay caused to the ternary information sequence 132 in the ternary error correction encoding circuit 103. A delayed binary transmission sequence 136 is sent to the six-phase demodulator 107. The six-phase demodulator 107 performs six-phase phase modulation of a 6-ary transmission sequence, which is composed by the ternary transmission sequence 134 and the binary transmission sequence 136, to send a resulting modulated signal 138 over a transmission line to the receiving device 121.

In the receiving apparatus 121, the six-phase demodulator 122 performs six-phase demodulation of the received signal 138 which has been sent from the transmitting apparatus 101 over the transmission line and received by the receiving apparatus 121, and outputs a ternary received sequence 139 and a binary received sequence 140. The ternary received sequence 139 is supplied to a ternary error decoding circuit 153. The ternary error correction decoding circuit 153 is a counterpart device of the ternary error correction encoding circuit 103 and corrects errors of the ternary received sequence 137 to generate a ternary decoded sequence 141. This ternary decoded sequence 141 is supplied to a 6-ary to binary conversion circuit 130. On the other hand, the binary received sequence 140 is delayed by the delay circuit 124 by a time corresponding to the delay caused to the ternary received sequence 134 by the ternary error correction decoding circuit 153 to produce a delayed binary received sequence 144, which is then sent to a high order digit correction circuit 129. This high order digit correction circuit 129 corrects the errors of the delayed binary received sequence 144, based on a ternary received sequence 139-1 and a ternary decoded sequence 139-2, supplied from the ternary error correction decoding circuit 153, to generate a binary decoded sequence 142. This binary decoded sequence 148 is sent to the 6-ary to binary converting circuit 130. The 6-ary to binary converting circuit 130 converts the input ternary decoded sequence 141 and binary decoded sequence 148 into a received binary signal 149 to output the received binary signal.

As describe above, the ternary BCH code is formed by the degree p generating polynominal p(x) having three coefficients of 0, 1 and 2 as elements as defined in the Equation (1).

If correction is to be made in both directions of +1 and −1 (corresponding to 2 in Galois field GF(3)), the code length n is $(3^p-1)/2$. In general, if the code length is n, the information length k is k=n−t·p, with the redundancy being (n−k)/n, in case of correction of t-tuple errors.

In case of a single error correction ternary BCH code, the generating polynomial as an example is the three-degree generating polynomial as define in the Equation (2).

If the bi-directional error correction is considered, the code length and the information length, for example, are 13 and 10, respectively, with the check matrix H being:

$$H = \begin{bmatrix} 1 & 0 & 0 & 2 & 0 & 2 & 1 & 2 & 2 & 1 & 0 & 2 & 2 \\ 0 & 1 & 0 & 1 & 2 & 1 & 1 & 2 & 0 & 1 & 1 & 1 & 0 \\ 0 & 0 & 1 & 0 & 1 & 2 & 1 & 1 & 2 & 0 & 1 & 1 & 1 \end{bmatrix} \quad (3')$$

Figure 3:
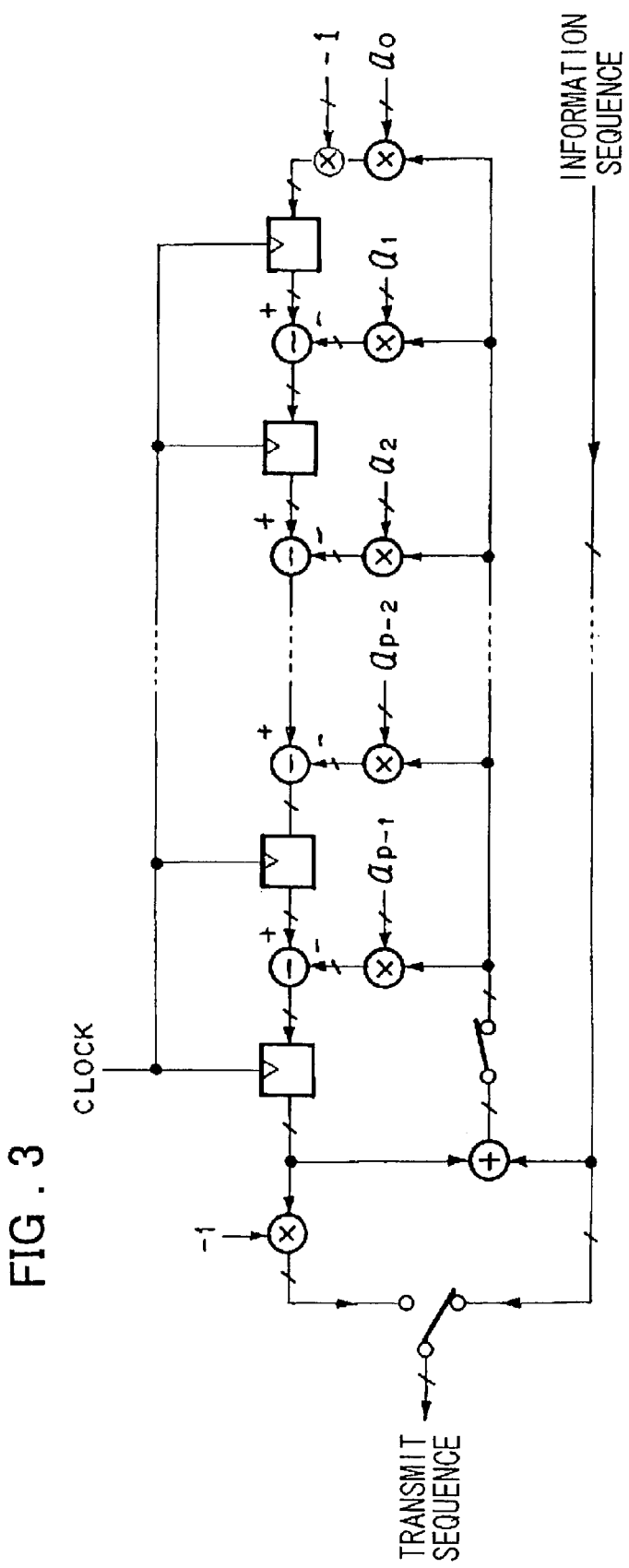
FIG. 3 is a block diagram showing a configuration of a ternary error correction encoding circuit according to the embodiment of the present invention.

The binary to 6-ary conversion circuit 102 is of the same structure as that of FIG. 1. The binary to 6-ary conversion circuit 102 can be implemented with the use of a ROM as shown in FIG. 2. The ternary error correction encoding circuit 103 is of the same structure as that of FIG. 1 and may be constituted for example as shown in FIG. 3. It is noted that the adder and the multiplier execute addition and multiplication on the Galois field GF(3), respectively. The rules of the addition and the multiplication on the Galois field GF(3) are as shown in the above described Table 1. The six-phase demodulator 107 is of the same structure as that of FIG. 1 and has a structure shown by way of an example in FIG. 7. The six-phase phase demodulator 122 is of the same structure as that of FIG. 1, which effects mapping from the information points on the phase plane to symbol values, and may have a structure shown by way of an example in FIG. 8.

A specified structure of the ternary error correction decoding circuit 153 is explained. This ternary error correction decoding circuit 153 is of a structure shown by way of an example in FIG. 18.

Figure 18:
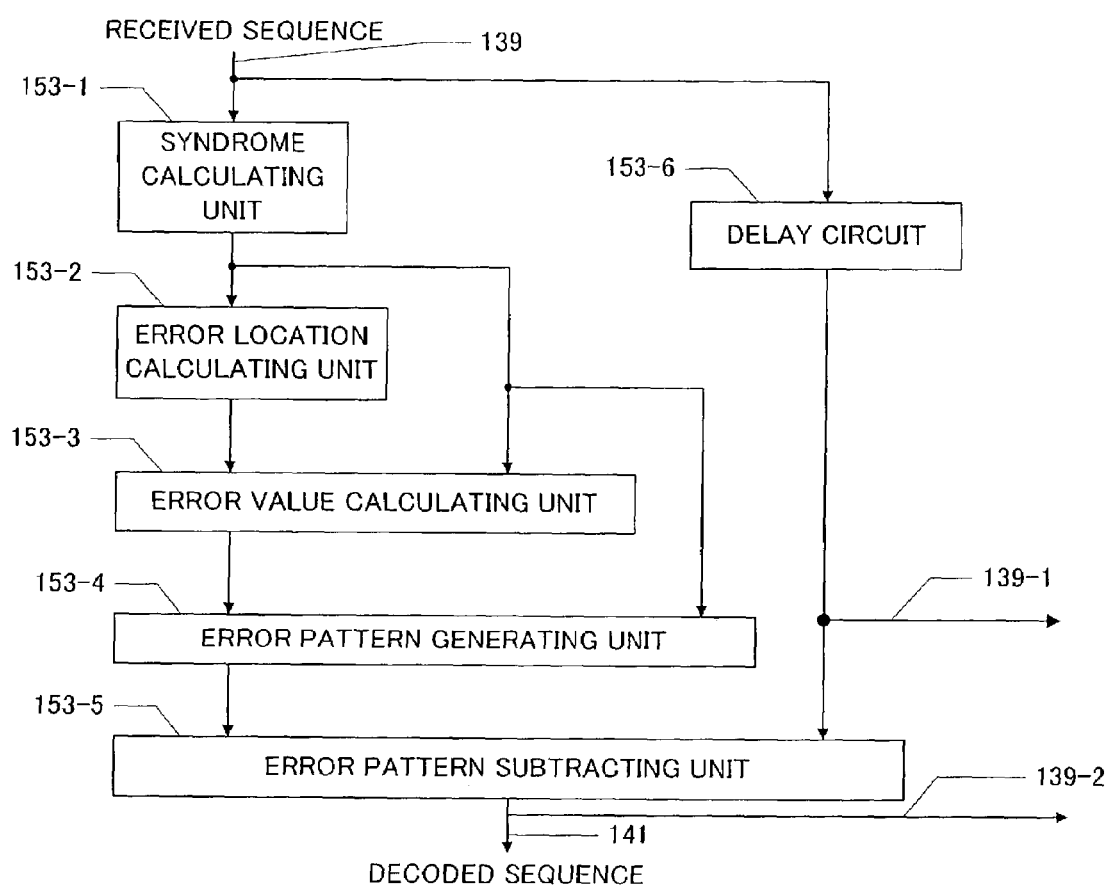
FIG. 18 is a block diagram showing a configuration of a ternary error correction-decoding unit according to the other embodiment of the present invention.

Referring to FIG. 18, the ternary error correction decoding circuit 153 includes a syndrome calculating unit 153-1, an error location calculating unit 153-2, an error value calculating unit 123-3, an error pattern generating unit 153-4, a delay circuit 153-6 and an error pattern subtraction unit 153-5.

The syndrome calculating unit 153-1 computes the syndrome of a ternary received sequence 139. The error location-calculating unit 153-2 generates an error locator polynomial, from the syndrome, and solves the error locator polynomial to compute an error location. The error value-calculating unit 153-3 is supplied with the syndrome and with the error location and computes an error value from the error locator polynomial and a derivative of the error locator polynomial. The error pattern-generating unit 153-4 generates an error pattern from the error location and from the error value. The delay circuit 153-6 delays the ternary received signal sequence a preset time. The error pattern subtraction unit 153-6 subtracts the error pattern from the delayed ternary received signal sequence to output a ternary decoded sequence 141. Meanwhile, a ternary received sequence 139-1 and a ternary decoded sequence 139-2 are sent to the high order digit correction circuit 129.

The high order digit correction circuit 129 is now explained. If the fact that the probability of occurrence of an error with a value of 1 or −1 is much higher than that of an error with a value of 2 is considered, an optimum result of error correction is obtained when it is supposed that, if an error occurs, the error is 1 or −1 at all times. The high-order digit correction circuit 129 operates under this supposition to correct the high-order digit responsive to the contents of correction of the low-order digit of the received symbol as follows:

(1) If the received symbol is (0,0) and there is no correction of the low-order digit by the ternary error correction decoding circuit 153, it is presumed that no error is occurring such that the high-order digit is not corrected. As a result, the decoded symbol is (0,0).

(2) If the received symbol is (0,0), and the low-order digit of the received symbol is corrected from 0 to 1 by the ternary error correction decoding circuit 153, it is presumed that an error with a value of −1 is occurring, such that the high-order digit is not corrected. As a result, the decoded symbol is (0,1).

(3) If the received symbol is (0,0) and the low-order digit of the received symbol has been corrected from 0 to 2 by the ternary error correction decoding circuit 153, it is presumed that an error with a value of 1 is occurring, and the high-order digit is corrected from 0 to 1. That is, if the low-order digit is corrected from 0 to 2 without correcting the high-order digit, the result is shift to a symbol differing in two values. If the low-order digit is corrected from 0 to 2 and the high-order digit is corrected from 0 to 1, the result is shift to a symbol differing in one value. The result is that the decoded symbol is (1,2).

(4) If the received symbol is (0,1), and there is no correction of the low-order digit by the ternary error correction decoding circuit 153, it is presumed that no error is occurring such that the high-order digit also is not corrected. As a result, the decoded symbol is (0,1).

(5) If the received symbol is (0,1) and the low-order digit of the received symbol is corrected by the ternary error correction decoding circuit 153, from 1 to 0, it is presumed that an error with a value of 1 is occurring and the high-order digit is not corrected. As a result, the decoded symbol is (0,0).

(6) If the received symbol is (0,1) and the low-order digit of the received symbol is corrected by the ternary error correction decoding circuit 153, from 1 to 2, it is presumed that an error with a value of −1 is occurring and the high-order digit is not corrected. As a result, the decoded symbol is (0,2).

(7) If the received symbol is (0,2) and the low-order digit of the received symbol is not corrected by the ternary error correction decoding circuit 153, it is presumed that no error is occurring and the high-order digit is not corrected. As a result, the decoded symbol is (0,2).

(8) If the received symbol is (0,2) and the low-order digit of the received symbol is corrected by the ternary error correction decoding circuit 153, from 2 to 0, it is presumed that an error with a value of −1 is occurring and the high-order digit is corrected from 0 to 1. As a result, the decoded symbol is (1,0).

(9) If the received symbol is (0,2) and the low-order digit of the received symbol is corrected by the ternary error correction decoding circuit 153, from 2 to 1, it is presumed that an error with a value of 1 is occurring and the high-order digit is not corrected. As a result, the decoded symbol is (0,1).

(10) If the received symbol is (1,0) and the low-order digit is not corrected by the ternary error correction decoding circuit 153, it is presumed that no error is occurring and the high-order digit is not corrected. As a result, the decoded symbol is (1,0).

(11) If the received symbol is (1,0) and the low-order digit of the received symbol is corrected by the ternary error correction decoding circuit 153, from 0 to 1, it is presumed that an error with a value of −1 is occurring and the high-order digit is not corrected. As a result, the decoded symbol is (1,1).

(12) If the received symbol is (1,0) and the low-order digit of the received symbol is corrected by the ternary error correction decoding circuit 153, from 0 to 2, it is presumed that an error with a value of 1 is occurring and the high-order digit is corrected from 1 to 0. As a result, the decoded symbol is (0,2).

(13) If the received symbol is (1,1) and the low-order digit is not corrected by the ternary error correction decoding circuit 153, it is presumed that no error is occurring and the high-order digit is not corrected. As a result, the decoded symbol is (1,1).

(14) If the received symbol is (1,1) and the low-order digit of the received symbol is corrected by the ternary error correction decoding circuit 153, from 1 to 0, it is presumed that an error with a value of 1 is occurring and the high-order digit is not corrected. As a result, the decoded symbol is (1,0).

(15) If the received symbol is (1,1) and the low-order digit of the received symbol is corrected by the ternary error correction decoding circuit 153, from 1 to 2, it is presumed that an error with a value of −1 is occurring and the high-order digit is not corrected. As a result, the decoded symbol is (1,2).

(16) If the received symbol is (1,2) and the low-order digit is not corrected by the ternary error correction decoding circuit 153, it is presumed that no error is occurring and the high-order digit is not corrected. As a result, the decoded symbol is (1,2).

(17) If the received symbol is (1,2) and the low-order digit of the received symbol is corrected by the ternary error correction decoding circuit 153, from 2 to 0, it is presumed that an error with a value of −1 is occurring and the high-order digit is corrected from 1 to 0. As a result, the decoded symbol is (0,0).

(18) If the received symbol is (1,2), and the low-order digit of the received symbol is corrected by the ternary error correction decoding circuit 153, from 2 to 1, it is presumed that an error with a value of 1 is occurring and the high-order digit is not corrected. As a result, the decoded symbol is (1,1).

The contents of the above correction are summarized in the above-described Table 4.

As may be seen from the above Table 4, if the low-order digit of a given received symbol is corrected from 2 to 0 or from 0 to 2, the high-order digit correction circuit 129 complements the high-order digit of the received symbol and, if otherwise, the high-order digit correction circuit 129 does not complement the high-order digit.

Figure 11:
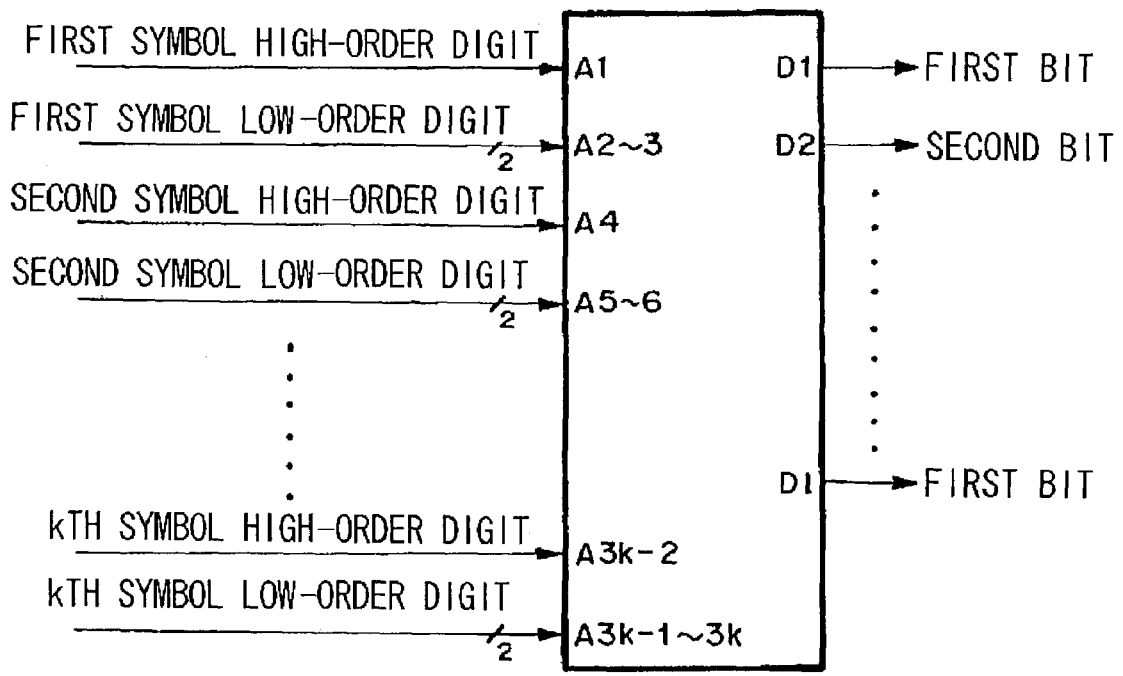
FIG. 11 is a block diagram showing a configuration of a 6-ary to binary circuit according to the embodiment of the present invention.

The 6-ary to binary converting circuit 130 is of the same structure with that of FIG. 1 and may also be implemented with the use of a ROM supplied as an address with an n-ary decoded sequence made up of k symbols and outputting a binary signal of a number of bits 1 which is the largest possible value of values satisfying the relationship: $1 \leq k \times \log_2 6 = 2.585k$ as data as shown in FIG. 11.

A specific example of the present embodiment will be described. The ternary error correction encoding circuit 103, in case the equation (2) is adopted as a generating polynomial, is as shown in FIG. 4a. The circuit of FIG. 4a operates with a timing shown in FIG. 4b.

Figure 19:
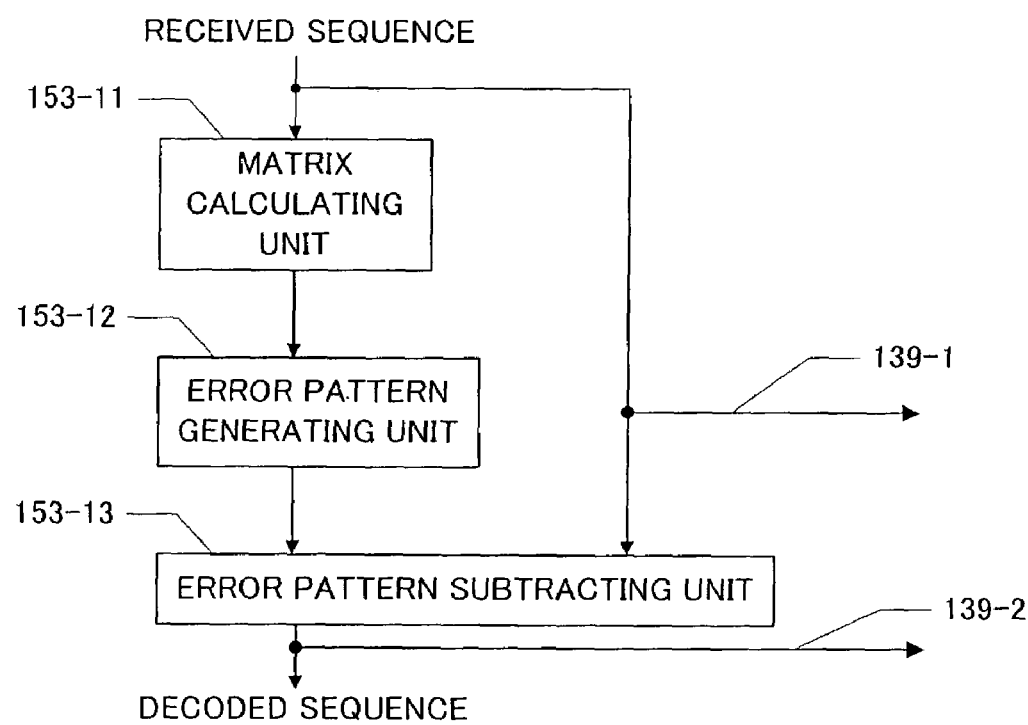
FIG. 19 is a block diagram showing a configuration of a ternary error correction decoding unit according to the other embodiment of the present invention.

In a case of a ternary BCH code with the code length of 13 and with the information length of 10, the ternary error correction decoding circuit 153 may be constructed using a check matrix shown in FIG. 3. FIG. 19 is a diagram illustrating a structure of the ternary error correction decoding circuit 153.

As shown in FIG. 19, the ternary error correction decoding circuit 153 includes a matrix-calculating unit 153-11, an error pattern generating unit 153-12 and an error pattern-subtracting unit 153-13.

If the received sequence is a vector $y=\{y1, y2, \ldots, y13\}$, the matrix calculating unit 153-11 finds the syndrome $s=\{s1, s2, s3\}$ by calculations of $s=yH^T$, where $H^T$ is a transpose of a matrix H.

The error pattern generating 153-12 finds a set of (error location, error value) from the syndrome values in accordance with the following Table 3. Thus, the error pattern generating 153-12 may be composed by a ROM which executes the mapping of the following Table 6.

TABLE 6

| Syndrome Values | | | (Error Location and Error Value) |
|---|---|---|---|
| 1 | 0 | 0 | (1, 1) |
| 2 | 0 | 0 | (1, 2) |
| 0 | 1 | 0 | (2, 1) |
| 0 | 2 | 0 | (2, 2) |
| 0 | 0 | 1 | (3, 1) |
| 0 | 0 | 2 | (3, 2) |
| 2 | 1 | 0 | (4, 1) |
| 1 | 2 | 0 | (4, 2) |
| 0 | 2 | 1 | (5, 1) |
| 0 | 1 | 2 | (5, 2) |
| 2 | 1 | 2 | (6, 1) |
| 1 | 2 | 1 | (6, 2) |
| 1 | 1 | 1 | (7, 1) |
| 2 | 2 | 2 | (7, 2) |
| 2 | 2 | 1 | (8, 1) |
| 1 | 1 | 2 | (8, 2) |
| 2 | 0 | 2 | (9, 1) |
| 1 | 0 | 1 | (9, 2) |
| 1 | 1 | 0 | (10, 1) |
| 2 | 2 | 0 | (10, 2) |
| 0 | 1 | 1 | (11, 1) |
| 0 | 2 | 2 | (11, 2) |
| 2 | 1 | 1 | (12, 1) |
| 1 | 2 | 2 | (12, 2) |
| 2 | 0 | 1 | (13, 1) |
| 1 | 0 | 2 | (13, 2) |

In the above-described embodiments, explanation has been made of a case of six-phase phase modulation of 6-ary signals in which the high-order digit is binary and the lower digit is ternary. Alternately, the high-order digit may be of a value different from 2.

For example, the high-order digit and the low-order digit may be four-binary and ternary, as shown in FIG. 14. In this case, the relationship between the received symbols, low-order digit following the correction and the decoded symbol is as shown in the above Table 5.

Figure 20:
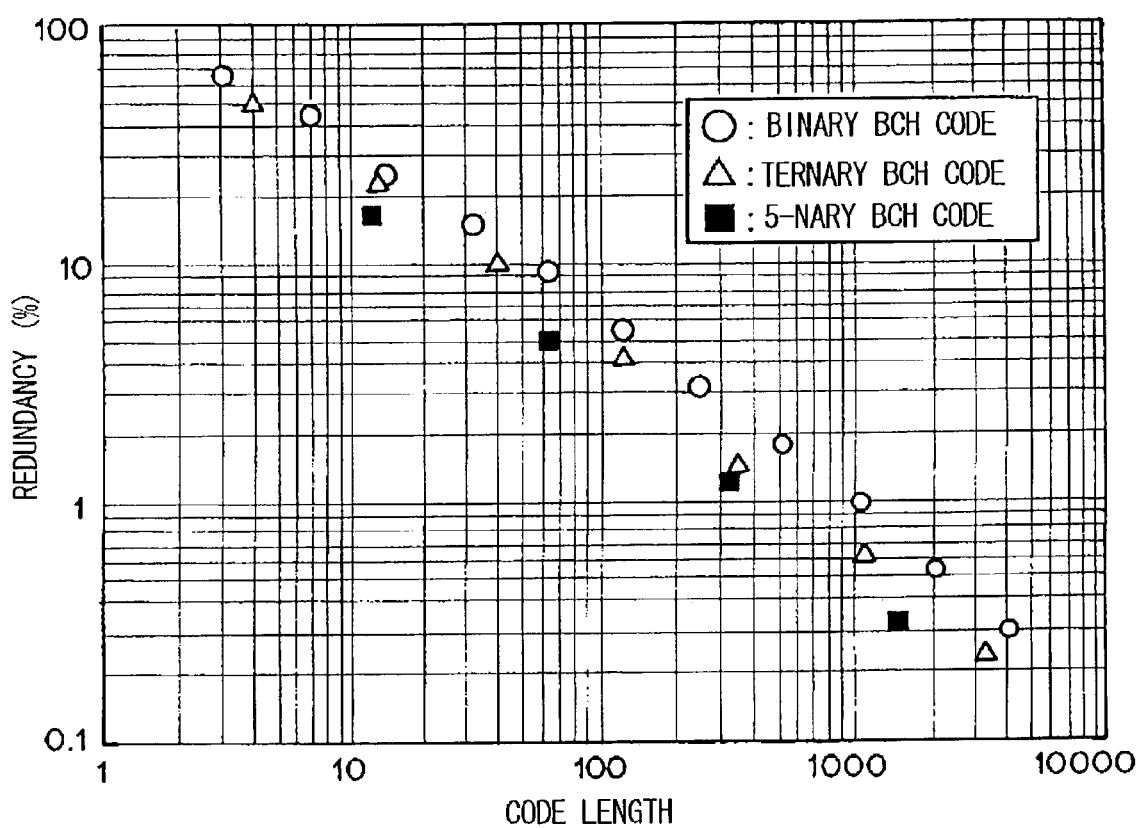
FIG. 20 is a block diagram showing a configuration of a ternary error correction-decoding unit according to the other embodiment of the present invention.

According to the above embodiment shown in FIG. 17, the ternary error correction code is applied in the six-phase phase modulation, so that a feature not obtained on application of the binary error correction code may be obtained. That is, referring to FIG. 20, showing a graph in which the code length of the binary, ternary and quinary BCH codes is plotted against redundancy, the code length for the nonbinary error correction code is shorter than that for the binary error correction code for approximately the same redundancy. The code length being shorter for the same redundancy in the case of the nonbinary error correction code means a code correction capability being higher in this case than in the case of the binary error correction code. In single-fold error correction in general, the symbol error rate following the error correction for a symbol error rate p is approximately $(3/2)\times(n-1)\times p^2$ when the error rate is sufficiently smaller than the reciprocal of the code length. Thus, it may be seen that the shorter the code length, the more favorable is the error rate.

In the six-phase phase modulation, the required C/N values in realizing an error rate of $10^{-6}$ for QPSK, 6PSK and 8PSK are 13.7 dB, 16.7 dB and 19.0 dB, respectively, while the required bandwidths for QPSK, 6PSK and 8PSK are 1.0, 0.8 and 0.6, in terms of relative values, respectively. Up to now, 8PSK has been used as a modulation system which is higher in frequency utilization efficiency than QPSK. With this 8PSK, the required frequency range has been narrowed from 1 to 0.66 for improving the efficiency. However, the required C/N ratio is increased by 5.3 (=19.0–13.7) dB. With the application of the technique of the six-phase phase modulation, the required frequency range may be narrowed with advantage from 1.0 to 0.8, while the required C/N needs to be increased by only 3.0 (=16.7–13.7) dB. Since a further encoding gain of 2 to 3 dB may be obtained by application of the technique of the present invention, it is possible to narrow the frequency range by approximately 20%, as compared to the case of the QPSK, for an increase of the C/N which is slightly lower than 1 dB.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A communication system including a transmitting apparatus and a receiving apparatus for transmitting and receiving signals over a transmission line, wherein
said transmitting apparatus comprises:
a binary to n-ary conversion unit for converting a binary transmit signal into an n-ary transmit sequence and a ternary information sequence, where n is an integer exceeding 1;
an encoding unit for generating a ternary transmit sequence comprised of a nonbinary error correction code, based on said ternary information sequence;
a transmit side parity generation unit for generating a parity for said ternary transmit sequence; and
a modulator for modulating said n-ary transmit sequence, said ternary transmit sequence, and said parity generated by said parity generation unit into a 3n-ary signal to send the 3n-ary signal to said receiving apparatus; and wherein
said receiving apparatus comprises:
a demodulator for demodulating a 3n-ary received signal sent from said transmitting apparatus and received by said receiving apparatus to produce an n-ary received sequence, a ternary received sequence, and a received parity;
a receive side parity generation unit for generating a parity for said ternary received sequence;
a parity comparison unit for comparing said parity generated by said receive side parity generation unit with said received parity to determine a parity difference therebetween;
a first decoding unit for decoding said ternary received sequence by using said parity difference and a method of decoding a nonbinary error correction code to produce a ternary decoded sequence;
a second decoding unit for correcting said n-ary received sequence according to contents of correction of said ternary received sequence performed by said first decoding unit to produce an n-ary decoded sequence; and
an n-ary to binary conversion unit for producing a binary received signal from said n-ary decoded sequence and said ternary decoded sequence.

2. The communication system according to claim 1, wherein
said transmitting apparatus further comprises a parity insertion unit which inserts said parity generated by said transmit side parity generation unit into said n-ary transmit sequence, said parity generated by said transmit side parity generation unit being included in said n-ary transmit sequence, and wherein
said receiving apparatus further comprises a parity separation unit for separating said received parity from said n-ary received sequence.

3. The communication system according to claim 1, wherein
said transmitting apparatus further comprises a parity insertion unit which inserts said parity generated by said transmit side parity generation unit into said ternary transmit sequence, said parity generated by said transmit side parity generation unit being included in said ternary transmit sequence, and wherein
said receiving apparatus further comprises a parity separation unit for separating said received parity from said ternary received sequence.

4. The communication system according to claim 1, wherein said modulator is comprised of a phase modulator and said demodulator is comprised of a phase demodulator.

5. The communication system according to claim 1, wherein
said second decoding unit corrects a value of a symbol in said n-ary received sequence corresponding to a symbol in said ternary received sequence for which correction from 2 to 0 or from 0 to 2 is performed.

6. A transmitting apparatus comprising:
a binary to n-ary conversion unit for converting a binary transmit signal to an n-ary transmit sequence and a ternary information sequence, where n is an integer exceeding 1;
an encoding unit for generating a ternary transmit sequence comprised of a nonbinary error correction code, based on said ternary information sequence;
a parity generation unit for generating a parity for said ternary transmit sequence; and
a modulator for modulating said n-ary transmit sequence, said ternary transmit sequence, and said parity generated by said parity generation unit into a 3n-ary signal for transmission.

7. The transmitting apparatus according to claim 6, further comprising:
a parity insertion unit for inserting said parity generated by said parity generation unit into said n-ary transmit sequence, wherein said parity generated by said transmitting parity generation unit is included in said n-ary transmit sequence.

8. The transmitting apparatus according to claim 6, further comprising:
a parity insertion unit for inserting said parity generated by said parity generation unit into said ternary transmit sequence; wherein said parity generated by said transmitting parity generation unit is included in said ternary transmit sequence.

9. The transmitting apparatus according to claim 6, wherein said modulator is comprised of a phase modulator.

10. A receiving apparatus comprising:
a demodulator for demodulating a 3n-ary received signal to produce an n-ary received sequence, a ternary received sequence, and a received parity, where n is an integer exceeding 1;
a parity generation unit for generating a parity for said ternary received sequence;
a parity comparison unit for comparing said parity generated by said parity generation unit with said received parity to determine a parity difference therebetween;
a first decoding unit for decoding said ternary received sequence by using said parity difference and a method of decoding a nonbinary error correction code to produce a ternary decoded sequence;
a second decoding unit for correcting said n-ary received sequence according to contents of correction of said ternary received sequence performed by said first decoding unit to produce an n-ary decoded sequence; and
an n-ary to binary converting unit for producing a binary received signal from said n-ary decoded sequence and said ternary decoded sequence.

11. The receiving apparatus according to claim 10, wherein
said parity obtained by said demodulator is included in said n-ary received sequence, and wherein
said receiving apparatus further comprises a parity separation unit for separating said received parity from said n-ary received sequence.

12. The receiving apparatus according to claim 10, wherein
said parity obtained by said demodulator is included in said ternary received sequence, and wherein
said receiving apparatus further comprises a parity separation unit for separating said received parity from said ternary received sequence.

13. The receiving apparatus according to claim 10, wherein said demodulator is comprised of a phase demodulator.

14. The receiving apparatus according to claim 10, wherein said second decoding unit corrects a value of a symbol in said n-ary received sequence corresponding to a symbol in said ternary received sequence for which correction from 2 to 0 or from 0 to 2 is performed.

15. The receiving apparatus according to claim 10, wherein
the first decoding unit comprises:
an error pattern generating unit for performing mapping of a combination of a syndrome value and a parity difference value into an error location and an error value to produce an error pattern according to the error location and the error value; and
an error-subtracting unit for subtracting the error pattern from the ternary received sequence to produce the ternary decoded sequence, wherein the ternary received sequence before subtraction and the ternary decoded sequence after subtraction are supplied to the second decoding unit as the ternary received sequence and the ternary decoded sequence, respectively.

16. A communication method for transmitting and receiving signals over a transmission line, said method comprising the steps of:
a transmitting apparatus converting a binary transmit signal into an n-ary transmit sequence and a ternary information sequence, where n is an integer exceeding 1;
said transmitting apparatus generating a ternary transmit sequence comprised of a nonbinary error correction code, based on said ternary information sequence;
said transmitting apparatus generating a parity for said ternary transmit sequence;
said transmitting apparatus modulating said n-ary transmit sequence, said ternary transmit sequence, and said parity into a 3n-ary signal to send the 3n-ary signal to a receiving apparatus;
said receiving apparatus demodulating a 3n-ary received signal sent from said transmitting apparatus and received by said receiving apparatus to produce an n-ary received sequence, a ternary received sequence, and the received parity;
said receiving apparatus generating a parity for said ternary received sequence;
said receiving apparatus comparing said parity generated for said ternary received sequence with said received parity to determine a parity difference therebetween;
said receiving apparatus decoding said ternary received sequence by using said parity difference and a method of decoding a nonbinary error correction code, to produce a ternary decoded sequence;
said receiving apparatus correcting said n-ary received sequence according to contents of correction of said ternary received sequence, to produce an n-ary decoded sequence; and
said receiving apparatus producing a binary received signal from said n-ary decoded sequence and said ternary decoded sequence.

17. The method according to claim 16, said method further comprising the steps of:
said transmitting apparatus inserting said parity for said ternary transmit sequence into said n-ary transmit sequence; wherein said parity generated for said ternary transmit sequence is included in said n-ary transmit sequence; and
said receiving apparatus separating said received parity from said n-ary received sequence.

18. The method according to claim 16, said method further comprising the steps of:
said transmitting apparatus inserting said parity generated for said ternary transmit sequence into said ternary transmit sequence, wherein said parity generated for said ternary transmit sequence is included in said ternary transmit sequence; and
said receiving apparatus separating said received parity from said ternary received sequence.

19. The method according to claim 16, wherein said modulation comprises phase modulation and said demodulation comprises phase demodulation.

20. The method according to claim 16, wherein in the step of correcting said n-ary received sequence, a value of a symbol in said n-ary received sequence corresponding to a symbol in said ternary received sequence for which correction from 2 to 0 or from 0 to 2 is performed is corrected.

21. A method of transmitting a signal comprising the steps of:
  converting a binary transmit signal to an n-ary transmit sequence and a ternary information sequence, where n is an integer exceeding 1;
  generating a ternary transmit sequence that includes a nonbinary error correction code, based on said ternary information sequence;
  generating a parity for said ternary transmit sequence; and
  modulating said n-ary transmit sequence, said ternary transmit sequence, and said parity into a 3n-ary signal to transmit the 3n-ary signal.

22. The method according to claim 21, further comprising a step of:
  inserting said parity generated for said ternary transmit sequence into said n-ary transmit sequence, said parity generated for said ternary transmit sequence being included in said n-ary transmit sequence.

23. The method according to claim 21, further comprising a step of:
  inserting said parity generated for said ternary transmit sequence into said ternary transmit sequence, said parity generated for said ternary transmit sequence being included in said ternary transmit sequence.

24. The method according to claim 21, wherein said modulation comprises phase modulation.

25. A method of receiving a signal comprising the steps of:
  demodulating a 3n-ary received signal to obtain an n-ary received sequence, a ternary received sequence, and a received parity, where n is an integer exceeding 1;
  generating a parity for said ternary received sequence;
  comparing said parity generated for said ternary received sequence with said received parity to determine a parity difference therebetween;
  decoding said ternary received sequence by using said parity difference and a method of decoding a nonbinary error correction code, to produce a ternary decoded sequence;
  correcting said n-ary received sequence according to contents of correction of said ternary received sequence, to produce an n-ary decoded sequence; and
  producing a binary received signal from said n-ary decoded sequence and said ternary decoded sequence.

26. The method according to claim 25, wherein said parity obtained by said demodulation is included in said n-ary transmit sequence, and wherein
  the method further comprises a step of separating said received parity from said n-ary received sequence.

27. The method according to claim 25, wherein said parity obtained by said demodulation is included in said ternary transmit sequence, and wherein
  the method further comprises a step of separating said received parity from said ternary received sequence.

28. The method according to claim 25, wherein said demodulation comprises phase demodulation.

29. The method according to claim 25, wherein in a step of correcting said n-ary received sequence, a value of a symbol in said n-ary received sequence corresponding to a symbol in said ternary received sequence for which correction from 2 to 0 or from 0 to 2 is performed is corrected.

30. A communication system including a transmitting apparatus and a receiving apparatus for transmitting and receiving signals over a transmission line, wherein
  said transmitting apparatus comprises:
  a binary to n-ary conversion unit for converting a binary transmit signal to an n-ary transmit sequence and a ternary information sequence, where n is an integer exceeding 1;
  an encoding unit for generating a ternary transmit sequence comprised of a nonbinary error correction code, based on said ternary information sequence; and
  a modulator for modulating said n-ary transmit sequence and said ternary transmit sequence into a 3n-ary signal to send the 3n-ary signal to said receiving apparatus; and wherein
  said receiving apparatus comprises:
  a demodulator for demodulating a 3n-ary received signal sent from said transmitting apparatus and received by said receiving apparatus for producing an n-ary received sequence and a ternary received sequence;
  a first decoding unit for decoding said ternary received sequence by using a method of decoding a nonbinary error correction code to produce a ternary decoded sequence;
  a second decoding unit for correcting said n-ary received sequence according to contents of correction of said ternary received sequence performed by said first decoding unit to produce an n-ary decoded sequence; and
  an n-ary to binary conversion unit for producing a binary received signal from said n-ary decoded sequence and said ternary decoded sequence.

31. The communication system according to claim 30 wherein
  said modulator is comprised of a phase modulator and wherein said demodulating unit is comprised of a phase demodulator.

32. The communication system according to claim 30, wherein
  said second decoding unit corrects a value of a symbol in said n-ary received sequence corresponding to a symbol in said ternary received sequence for which correction from 2 to 0 or from 0 to 2 is performed.

33. A transmitting apparatus comprising:
  a binary to n-ary conversion unit for converting a binary transmit signal to an n-ary transmit sequence and a ternary information sequence, where n is an integer exceeding 1;
  an encoding unit for generating a ternary transmit sequence, composed of a nonbinary error correction code, based on said ternary transmission sequence; and
  a modulator for modulating said n-ary transmit sequence and said ternary transmit sequence into a 3n-ary signal for transmission.

34. The transmitting apparatus according to claim 33, wherein said modulator is comprised of a phase modulator.

35. A receiving apparatus comprising:
  a demodulator for demodulating a 3n-ary received signal to produce an n-ary received sequence and a ternary received sequence, where n is an integer exceeding 1;
  a first decoding unit for decoding said ternary received sequence by using a method of decoding a nonbinary error correction code to produce a ternary decoded sequence;
  a second decoding unit for correcting said n-ary received sequence, according to contents of correction of said ternary received sequence by said first decoding unit to produce an n-ary decoded sequence; and
  an n-ary to binary conversion unit for producing a binary received signal from said n-ary decoded sequence and said ternary decoded sequence.

36. The receiving apparatus according to claim 35, wherein said demodulator is comprised of a phase modulator.

37. The receiving apparatus according to claim 35, wherein
said second decoding unit corrects a value of a symbol in said n-ary received sequence corresponding to a symbol in said ternary received sequence for which correction from 2 to 0 or from 0 to 2 is performed.

38. The receiving apparatus according to claim 35, wherein
the first decoding unit comprises:
a syndrome calculating unit for computing the syndrome of a ternary received sequence;
an error location calculating unit for generating an error locator polynomial, from the syndrome, and for solving the error locator polynomial to compute an error location;
an error value calculating unit for receiving the syndrome and the error location and for computing an error value from the error locator polynomial and a derivative of the error locator polynomial;
an error pattern generating unit for generating an error pattern from the error location and from the error value; and
an error pattern subtraction unit for subtracting the error pattern from the ternary received signal sequence to output a ternary decoded sequence, wherein the ternary received sequence and the ternary decoded sequence are supplied to the second decoding unit.

39. The receiving apparatus according to claim 35, wherein
the first decoding unit comprises:
a matrix calculating unit for calculating a syndrome from a matrix computation of a vector of the received sequence and a check matrix;
an error pattern generating unit for finding a set of error location, error value from the syndrome; and
an error pattern subtracting unit for subtracting the error pattern from the ternary received signal sequence to output a ternary decoded sequence, wherein the ternary received sequence and the ternary decoded sequence are supplied to the second decoding unit.

40. A communication method for transmitting and receiving signals over a transmission line, comprising the steps of:
said transmitting apparatus converting a binary transmit signal to an n-ary transmit sequence and a ternary information sequence, where n is an integer exceeding 1;
said transmitting apparatus generating a ternary transmit sequence, comprised of a nonbinary error correction code, based on said ternary information sequence; and
said transmitting apparatus modulating said n-ary transmit sequence and said ternary transmit sequence into a 3n-ary signal to send the 3n-ary signal to said receiving apparatus;
a receiving apparatus demodulating a 3n-ary received signal sent from said transmitting apparatus and received by said receiving apparatus to produce an n-ary received sequence and a ternary received sequence;
said receiving apparatus decoding said ternary received sequence by using a method of decoding a nonbinary error correction code to produce a ternary decoded sequence;
said receiving apparatus correcting said n-ary received sequence, according to contents of correction of said ternary received sequence, to produce an n-ary decoded sequence; and
said receiving apparatus producing a binary received signal from said n-ary decoded sequence and said ternary decoded sequence.

41. The communication method according to claim 40, wherein said modulation comprises phase modulation and wherein said demodulation comprises phase demodulation.

42. The communication method according to claim 40 wherein said receiving apparatus in said step of correcting said n-ary received sequence corrects a value of a symbol in said n-ary received sequence corresponding to a symbol in said ternary received sequence for which correction from 2 to 0 or from 0 to 2 is performed.

43. A method of transmitting a signal comprising the steps of:
converting a binary transmit signal to an n-ary transmit sequence and a ternary information sequence, where n is an integer exceeding 1;
generating a ternary transmit sequence, comprised of a nonbinary error correction code, based on said ternary information sequence; and
modulating said n-ary transmit sequence and said ternary transmit sequence into a 3n-ary signal to transmit the 3n-ary signal.

44. The method according to claim 43, wherein said modulation comprises phase modulation.

45. A method of receiving a signal comprising the steps of:
demodulating a 3n-ary received signal to produce an n-ary received sequence and a ternary received sequence;
decoding said ternary received sequence by using a method of decoding a nonbinary error correction code to produce a ternary decoded sequence;
correcting said n-ary received sequence, according to contents of correction of said ternary received sequence, to produce an n-ary decoded sequence; and
producing a binary received signal from said n-ary decoded sequence and said ternary decoded sequence.

46. The method according to claim 45, wherein said demodulation comprises phase modulation.

47. The method according to claim 45, wherein said receiving apparatus in said step of correcting said n-ary received sequence corrects a value of a symbol in said n-ary received sequence corresponding to a symbol in said ternary received sequence for which correction from 2 to 0 or from 0 to 2 is performed.

* * * * *